（12）United States Patent
Mueck et al.

(10) Patent No.: US 8,711,751 B2
(45) Date of Patent: Apr. 29, 2014

(54) METHODS AND APPARATUS FOR DYNAMIC IDENTIFICATION (ID) ASSIGNMENT IN WIRELESS NETWORKS

(75) Inventors: Markus Mueck, Unterhaching (DE); Andreas Schmidt, Braunschweig (DE)

(73) Assignee: Apple Inc., Cupertino, CA (US)

( * ) Notice: Subject to any disclaimer, the term of this patent is extended or adjusted under 35 U.S.C. 154(b) by 1200 days.

(21) Appl. No.: 12/567,327

(22) Filed: Sep. 25, 2009

(65) Prior Publication Data

US 2011/0076991 A1    Mar. 31, 2011

(51) Int. Cl.
    *H04H 20/71* (2008.01)

(52) U.S. Cl.
    USPC .......... 370/312; 455/411; 380/247; 380/270; 380/42; 380/43; 713/153; 713/163

(58) Field of Classification Search
    None
    See application file for complete search history.

(56) References Cited

U.S. PATENT DOCUMENTS

| | | | | |
|---|---|---|---|---|
| 4,802,218 A * | 1/1989 | Wright et al. | ..................... | 705/60 |
| 5,414,734 A * | 5/1995 | Marchetto et al. | ............ | 375/267 |
| 5,440,541 A * | 8/1995 | Iida et al. | ....................... | 370/352 |
| 6,047,179 A * | 4/2000 | Kirby | .......................... | 455/432.2 |
| 6,219,385 B1 * | 4/2001 | Weinberg | ...................... | 375/259 |
| 6,324,394 B1 * | 11/2001 | Vazvan | .......................... | 455/406 |
| 6,519,249 B1 * | 2/2003 | Bennefeld et al. | ............ | 370/352 |
| 6,611,537 B1 * | 8/2003 | Edens et al. | .................. | 370/503 |
| 6,707,915 B1 * | 3/2004 | Jobst et al. | .................... | 380/247 |
| 7,280,520 B2 * | 10/2007 | Melville et al. | ............... | 370/338 |
| 7,460,854 B2 * | 12/2008 | Griffith et al. | ................ | 455/410 |
| 7,603,101 B1 * | 10/2009 | Blewett et al. | ................ | 455/405 |
| 7,965,975 B2 * | 6/2011 | Venkatachalapathy | ...... | 455/3.01 |
| 8,023,472 B2 * | 9/2011 | Park | .............................. | 370/335 |
| 8,077,681 B2 * | 12/2011 | Ahmavaara et al. | .......... | 370/338 |
| 8,238,551 B2 * | 8/2012 | Reznik et al. | .................... | 380/44 |
| 8,285,992 B2 * | 10/2012 | Mathur et al. | ................ | 713/171 |
| 8,391,894 B2 * | 3/2013 | Venkatachalam | .......... | 455/456.3 |
| 2001/0005890 A1 * | 6/2001 | Nitaki | ........................... | 713/202 |
| 2002/0002041 A1 * | 1/2002 | Lindgren et al. | ............... | 455/404 |
| 2002/0028676 A1 * | 3/2002 | Kato | ............................ | 455/434 |
| 2002/0067284 A1 * | 6/2002 | Chamberlain et al. | ... | 340/870.02 |
| 2002/0099824 A1 * | 7/2002 | Bender et al. | ................. | 709/225 |
| 2002/0106028 A1 * | 8/2002 | Thyssen | ........................ | 375/243 |
| 2002/0184631 A1 * | 12/2002 | Cezeaux et al. | ................ | 725/44 |
| 2003/0081695 A1 * | 5/2003 | Eilts et al. | ...................... | 375/316 |
| 2003/0108127 A1 * | 6/2003 | Eilts et al. | ...................... | 375/340 |
| 2003/0193948 A1 * | 10/2003 | Hatae et al. | ................... | 370/392 |
| 2004/0042432 A1 * | 3/2004 | Riazi et al. | ................... | 370/338 |
| 2004/0068668 A1 * | 4/2004 | Lor et al. | ...................... | 713/201 |
| 2004/0139204 A1 * | 7/2004 | Ergezinger et al. | ........... | 709/229 |
| 2004/0152471 A1 * | 8/2004 | MacDonald et al. | ...... | 455/456.1 |
| 2004/0214578 A1 * | 10/2004 | Stenstrom et al. | ............ | 455/446 |
| 2004/0215721 A1 * | 10/2004 | Szeto et al. | .................... | 709/204 |
| 2005/0048961 A1 * | 3/2005 | Ribaudo et al. | ................ | 455/419 |
| 2005/0065678 A1 * | 3/2005 | Smith et al. | ..................... | 701/29 |

(Continued)

*Primary Examiner* — Ian N Moore
*Assistant Examiner* — Dung B Huynh
(74) *Attorney, Agent, or Firm* — Womble Carlyle Sandridge & Rice LLP

(57) ABSTRACT

Methods and apparatus that reduce user identification overhead for communications. In one aspect of the invention, a reciprocal transmission channel characteristic (e.g., the channel impulse response) is used to derive shared and anonymous user identification between two wireless devices. In one embodiment, subscription-less data transmissions are broadcast from a base station to multiple user equipment, each user equipment receiving its correspondingly identified subscription-less data. The use of quantization levels and/or levels of tolerance for compensating for non-ideal differences in recipient and transmitter channel characteristics are also disclosed.

26 Claims, 14 Drawing Sheets

(56) References Cited

U.S. PATENT DOCUMENTS

| | | | |
|---|---|---|---|
| 2005/0147025 A1* | 7/2005 | Auer | 370/203 |
| 2005/0195757 A1* | 9/2005 | Kidder et al. | 370/278 |
| 2005/0195763 A1* | 9/2005 | Kadous et al. | 370/328 |
| 2005/0245207 A1* | 11/2005 | Suzuki et al. | 455/101 |
| 2005/0245233 A1* | 11/2005 | Anderson | 455/411 |
| 2005/0261001 A1* | 11/2005 | Marley et al. | 455/456.1 |
| 2005/0288827 A1* | 12/2005 | Watkins | 701/1 |
| 2006/0030304 A1* | 2/2006 | Sofer et al. | 455/418 |
| 2006/0264178 A1* | 11/2006 | Noble et al. | 455/67.11 |
| 2006/0281414 A1* | 12/2006 | Lindoff et al. | 455/67.11 |
| 2007/0053330 A1* | 3/2007 | Stafford et al. | 370/338 |
| 2007/0058808 A1* | 3/2007 | Rudolf et al. | 380/44 |
| 2007/0088957 A1* | 4/2007 | Carson | 713/176 |
| 2007/0124250 A1* | 5/2007 | Yamashima et al. | 705/51 |
| 2007/0142038 A1* | 6/2007 | Shamanna | 455/414.1 |
| 2007/0155390 A1* | 7/2007 | Kodikara Patabandi et al. | 455/450 |
| 2007/0165845 A1* | 7/2007 | Ye et al. | 380/30 |
| 2007/0177729 A1* | 8/2007 | Reznik et al. | 380/44 |
| 2007/0218901 A1* | 9/2007 | Tenny | 455/436 |
| 2007/0226774 A1* | 9/2007 | Pardo-Blazquez et al. | 726/1 |
| 2007/0250893 A1* | 10/2007 | Akiyama et al. | 725/131 |
| 2007/0264991 A1* | 11/2007 | Jones et al. | 455/420 |
| 2008/0025293 A1* | 1/2008 | Kannan et al. | 370/353 |
| 2008/0123851 A1* | 5/2008 | Guccione et al. | 380/270 |
| 2008/0214212 A1* | 9/2008 | Pridmore et al. | 455/456.5 |
| 2008/0259892 A1* | 10/2008 | Li et al. | 370/342 |
| 2008/0304658 A1* | 12/2008 | Yuda et al. | 380/44 |
| 2009/0088185 A1* | 4/2009 | Beale | 455/458 |
| 2009/0122982 A1* | 5/2009 | Abrams et al. | 380/45 |
| 2009/0141900 A1* | 6/2009 | Ye et al. | 380/270 |
| 2009/0279700 A1* | 11/2009 | Ye et al. | 380/270 |
| 2009/0312018 A1* | 12/2009 | Moulsley et al. | 455/435.1 |
| 2009/0323791 A1* | 12/2009 | Yee | 375/224 |
| 2010/0050227 A1* | 2/2010 | Acharya et al. | 725/151 |
| 2010/0177663 A1* | 7/2010 | Johansson et al. | 370/254 |
| 2010/0316063 A1* | 12/2010 | Zhou et al. | 370/431 |
| 2011/0070900 A1* | 3/2011 | Shi et al. | 455/458 |

* cited by examiner

METHODS AND APPARATUS FOR DYNAMIC IDENTIFICATION (ID) ASSIGNMENT IN WIRELESS NETWORKS

RELATED APPLICATIONS

This application is related to co-owned and co-pending U.S. patent application Ser. No. 12,567,412 entitled "METHODS AND APPARATUS FOR COMPENSATION FOR CORRUPTED USER IDENTIFICATION DATA IN WIRELESS NETWORKS" filed on Sep. 25, 2009 (contemporaneously herewith), which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks and more particularly, in one exemplary aspect, to the implementation of user access and identification in such networks. More specifically, in one exemplary aspect, the present invention is directed to methods for efficient generation of anonymous user identification, such as for the provision of subscription-less services.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

Many current developments in wireless network technologies are directed to combining the connectivity associated with various wireless technologies (such as Wi-Fi, WiMAX, and cellular). Such envisioned heterogeneous networks may enable a user to instantly establish an "ad hoc" wireless network connection to another peer device, base station (e.g., macrocell, microcell, femtocell, picocell, etc.), access point, etc. A new class of "subscription-less" data services has emerged from this framework of steadily converging wireless technologies.

Subscription-Less Data Services

Current proposals for subscription-less data services seek to minimize the complexity of traditional network management overhead. For example, some subscription-less data services will not require registration at the network or service level prior to the initiation of communication. Subscription-less data services are targeted for instant and/or transient types of communication sessions; in some cases, subscription-less service enables the provision of anonymous services (e.g., data service regardless of user identity). Subscription-less data services may be useful in a wide variety of scenarios. For example, any wireless network host may provide disposable media such as e.g., advertisements, broadcasts, multicasts, user incentives, etc. Wandering users can consume such services without any long-term commitments (e.g., contracts, or fees, etc.).

Existing user access schemes provide secure user identification at the cost of significant messaging overhead, and some limited vulnerability. For example, UMTS cellular network access control is based on an authentication protocol called Authentication and Key Agreement (AKA). AKA is a challenge-response based mechanism that uses symmetric key cryptography. In the UMTS implementation of AKA, the user equipment (UE) must first identify itself before the Core Network can initiate the challenge-response; the Core Network will then initiate a challenge process to the UMTS Subscriber Identity Module (USIM), which is preprogrammed with the AKA response protocol. AKA does not tolerate differences between returned and expected responses.

Unfortunately, the complexity and security aspects of extant access control methods are in general poorly matched to the requirements of the aforementioned subscription-less data services. Accordingly, improved methods and apparatus are needed for user identification in simple or ad hoc networking systems. Furthermore, such improved solutions should ideally minimize user identification and or registration traffic between wireless networking entities for simple or ad hoc networks. Concurrently, suitable solutions should continue to guarantee adequate amounts of user privacy protection, and "uniqueness".

SUMMARY OF THE INVENTION

The present invention satisfies the foregoing needs by providing, inter aria, improved methods and apparatus for subscription-less user access and identification.

In one aspect of the invention, a method of providing a data service to a wireless device from a serving device is disclosed. In one embodiment, the method includes: receiving a first message from the wireless device; determining a first element based at least in part on one or more first transmission channel path characteristics of the first message; associating the data service to the first element; and transmitting the associated data service and the first element.

In one variant, responsive to receipt of the associated data service, the method performs the acts of determining a second element, the second element being determined based at least in part on one or more second transmission channel path characteristics of the transmitted associated data service; comparing the first element with the second element; and if the first element is substantially similar to the second element, decoding the associated data service.

In another variant, the one or more first transmission channel path characteristics is a channel impulse response (CIR).

In a further variant, the first message is a request for the data service, and the data service is a subscription-less data service.

In yet another variant, the wireless device and serving device comprise a mobile cellular device and a cellular base station, respectively.

In still another variant, the first element includes a temporary user ID determined by the serving device, and the second element includes a temporary user ID determined by the wireless device.

In a second aspect of the invention, serving apparatus is disclosed. In one embodiment, the serving apparatus if for anonymously providing a data service to a wireless device, and includes: a radio transceiver; a processing device in data communication with the radio transceiver; and a computer readable apparatus comprising a medium adapted to store a computer program. The computer program, when executed by the processing device: generates a first element based on a radio channel characteristic specific to the wireless device; associates the data service with the first element; transmits the data service and the first element via the radio transceiver; and does not identify the wireless device.

In one variant, the computer program is executed subsequent to the receipt of a request message, and the radio channel characteristic is derived from the received request message.

In another variant, the first element associated with the wireless device is discarded after the transmission of the data service.

In yet another variant, the radio channel characteristic is a time or frequency domain representation of a channel impulse response (CIR).

In a further variant, the radio channel characteristic is an array of distances or phase differences between time domain channel impulse response components.

In still a further variant, the generated first element is based on a quantized radio channel characteristic, and the computer program, when executed, additionally transmits (e.g., broadcasts) one or more parameters useful for quantization of the radio channel characteristic specific to the wireless device.

In a third aspect of the invention, a wireless apparatus is disclosed. In one embodiment, the apparatus is for receiving a data service from a serving device, and the wireless apparatus includes: a radio transceiver; a processing device in data communication with the radio transceiver; and a computer readable apparatus comprising a medium adapted to store a computer program. The computer program, when executed by the processing device: receives a data service and a first element via the radio transceiver; generates a second element based on a radio channel characteristic specific to the serving device; compares the first and second element; and consumes the data service if the first and second element are substantially equivalent.

In one variant, the wireless apparatus is configured to utilize a first quantization parameter to generate the second element. The first quantization parameter may be e.g., predefined, or received from the serving device.

In another variant, the computer program, when executed by the processing device, additionally determines the radio channel characteristic based on the received data service. The second element is e.g., a quantized radio channel characteristic specific to the serving device.

In a further variant, the computer program, when executed by the processing device, additionally transmits a first message comprising a request for the data service. The first message may not contain identifying information.

In another variant, the quantized radio channel characteristic includes one or more signal magnitudes, and/or one or more time or frequency (or phase) values.

In a fourth aspect of the invention, a method of providing data services using a wireless network is disclosed. In one embodiment, the method includes: utilizing one or more channel characteristics of a wireless channel, the wireless channel having substantially reciprocal transmission properties, to generate a unique identification for a wireless device requesting a data service. Utilization of the one or more channel characteristics does not require any information exchange between a serving device and a wireless device.

In one variant, the unique identification maintains the anonymity of the wireless device.

In another variant, the method further includes the serving device transmitting one or more multicast or broadcast messages; and responsive to receipt of the multicast or broadcast message, the wireless device identifying the serving device. The wireless device further transmits a request message; and responsive to receipt of the request message, the serving device transmits a data service. Responsive to receipt of the data service, the wireless device utilizes one or more channel characteristics of the wireless channel, to derive a second unique identification. The method may further comprise comparing the unique identification to the second unique identification derived by the mobile device based on the same wireless channel, to determine if the data service is intended for the mobile device.

In a fifth aspect of the invention, a mobile device is disclosed. In one embodiment, the mobile device includes: a wireless transceiver capable of transmitting and receiving signals over a substantially reciprocal wireless channel; and a processor in communication with the transceiver configured to process signals received via the wireless transceiver to determine a unique signature based on one or more channel path characteristics of the substantially reciprocal wireless channel, and utilize the unique signature, or an approximation thereof, as a unique identification (ID) for accessing a wireless network.

In a sixth aspect of the invention, a wireless system configured for dynamic identification using one or more channel characteristics is disclosed. In one embodiment, the system is a cellular system having a plurality of base stations and a plurality of mobile devices.

In a seventh aspect of the invention, a computer readable apparatus is disclosed. In one embodiment, the apparatus includes a computer readable medium having a computer program stored thereon, the program being configured to perform dynamic identification.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
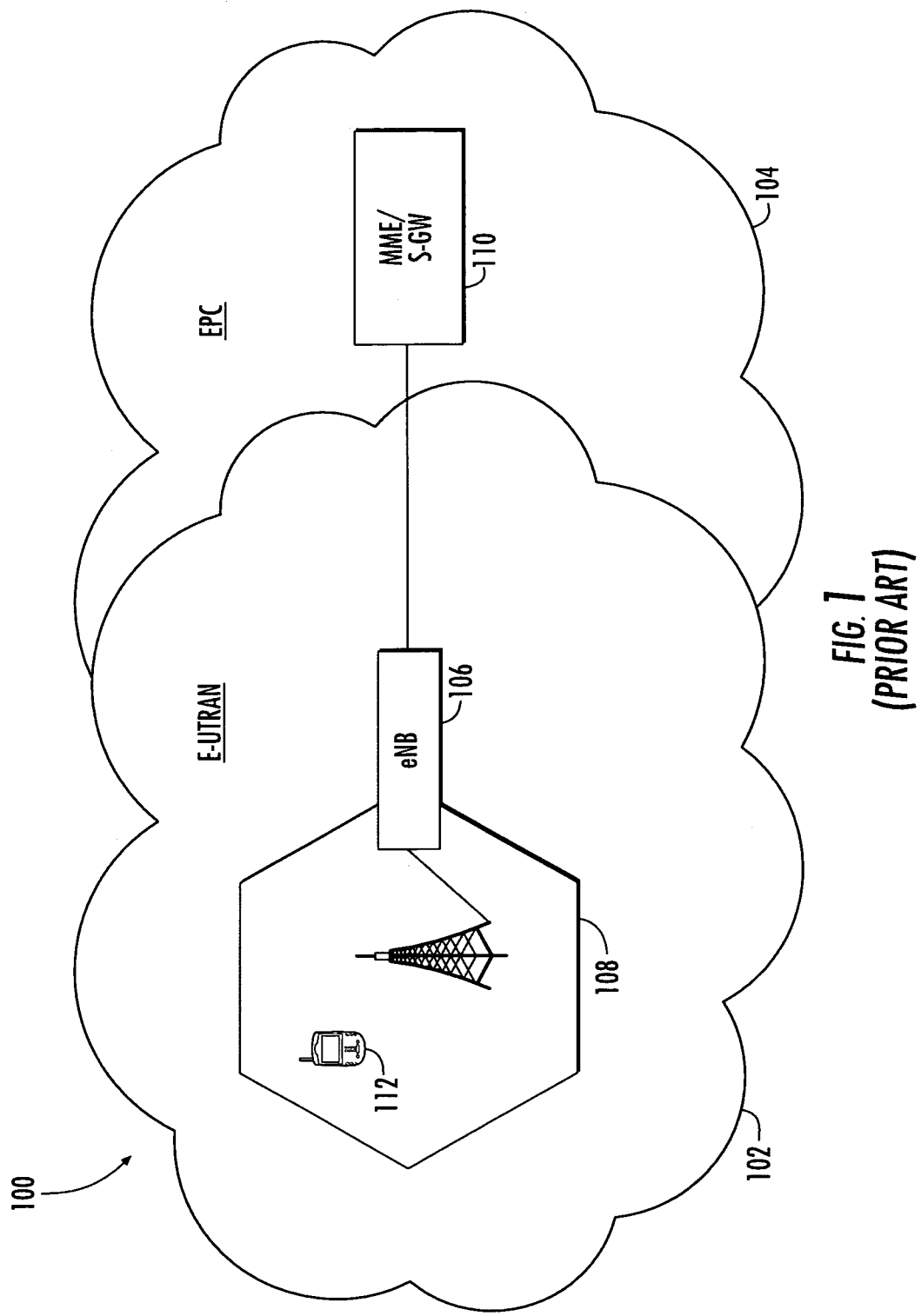
FIG. 1 is a graphical illustration of one embodiment of a prior art LTE network comprising an Evolved Packet Core (EPC), and an Evolved UMTS Terrestrial Radio Access Network (E-UTRAN).

Reference is now made to the drawings, wherein like numerals refer to like parts throughout.
Overview The present invention provides, inter alia, methods and apparatus that enable a first wireless device to uniquely identify a second wireless device based on one or more transmission channel characteristics, such as a multipath signature. In one aspect of the invention, a transmission path characteristic is used as a "pseudonym", and is selected to be unique, anonymous, and/or secure. This approach exploits the substantial reciprocity present in wireless channels in terms of their path characteristics (typically only for short periods of time) to both provide the aforementioned unique identification, and obviate signaling or other identification message exchanges typical of prior art wireless systems.

In one embodiment, data is transmitted, and the receiver estimates or characterizes the transmission channel based on, inter alia, its channel impulse response (CIR). The transmission of the data used for channel estimation can be entirely independent of the user identification or ID if desired. Moreover, any third party receiver that also receives the data sequence can derive its own channel impulse response to the transmitting device; however there is no possibility to derive or "guess" the channel impulse response between other devices, thereby maintaining a high degree of privacy and data integrity.

In another aspect, a subscription-less Random Access Channel (RACH) operation is disclosed, where the subscription-less RACH does not require registration to request subsequent data transmission.

In yet another aspect, channel characteristics are evaluated for data modulation and coding schemes, for provisioning of service without registration.

In still another aspect, a level of tolerance is contemplated for use with user identification on lossy channels, without a loss of security.

In one embodiment, a requesting device and a providing device are disclosed which derive a shared anonymous user ID or pseudonym based on their shared forward and reverse channel characteristics. In one implementation, the pseudonym is comprised of a representation of the aforementioned channel impulse response in the time domain. Alternatively, the pseudonym may comprise a representation of the channel impulse response (CIR) in the frequency domain.

In one alternate embodiment, optimization information is broadcast from the provider to ensure a common pseudonym with the requester(s). The channel characteristic identification scheme is used to augment or complement existing mobile device user identification schemes (such as for example those of the prior art described above). In one such variant, if the channel characteristic determination fails, existing user identification schemes are employed instead (e.g., as a fallback). The user identification schemes may also be used in a confirmatory fashion with respect to the channel characteristic determination.

The improved methods and apparatus of the invention effectively eliminate the transmission of sensitive user information on vulnerable "over the air" (OTA) channels, provide user security and privacy for subscription-less data services. These improved methods and apparatus also help protect against common malicious attacks (e.g., man-in-the-middle, spoofing, denial of service, etc.) by virtue of the unique and substantially transient "signature" created by the wireless channel existing between two participating devices.

Detailed Description Of Exemplary Embodiments

Exemplary embodiments of the present invention are now described in detail. While these embodiments are primarily discussed in the context of access control for the provisioning of subscription-less data services within a UMTS network, it will be recognized by those of ordinary skill that the present invention is in no way limited to UMTS, or any particular wireless network. For example, the described methods could also be used with non-3GPP related network access technologies, such as e.g., 3GPP2, WiMAX (IEEE Std. 802.16), PAN (e.g., IEEE Std. 802.15) or WLAN (e.g., IEEE Std. 802.11). Yet other applications will be recognized by those of ordinary skill given the present disclosure.

Moreover, while the various embodiments of the invention are described in terms of cellular systems utilizing subscription-less data transmissions, it is recognized that none of the foregoing is required for the practice of the invention. More generally, various aspects of the invention may find use in any application where user identification should or is desired to be anonymous, secure, disposable (i.e., non-persistent), and/or quickly generated. Common examples of such applications may include: ad hoc networking, commercial broadcasting, Mesh Networks, direct inter-UE information exchange (i.e., UEs which exchange information with one another without the Core Network), etc.

Throughout the following discussions, the term "pseudonym", "shared proxy user ID", and "proxy user ID", specifically refer to a CIR-based user ID. It is appreciated that certain circumstances may require the generation of a user ID using existing prior art techniques. Discussions of mixed operation (e.g., operation mixing both pseudonyms of the type used in the present invention, and legacy user IDs) are described in greater detail herein, and may be useful for mixed populations, and/or fallback operation (e.g., no available unique pseudonyms, inconsistent CIR, etc.).

Exemplary Cellular Architectures—

FIG. 1 illustrates one exemplary prior art high-level LTE cellular radio system 100 comprising the E-UTRAN (Evolved UMTS Terrestrial Radio Access Network) 102 and the Core Network EPC (Evolved Packet Core) 104. The E-UTRAN consists of a number of base stations (such as eNodeBs (eNBs)) 106. Each base station provides radio coverage for one or more mobile radio cells 108 within the E-UTRAN. In LTE, each eNB is connected to the EPC via a S1 interface. The eNBs directly connect to two EPC entities, the MME (Mobility Management Entity) and the Serving Gateway (S-GW) 110. The MME is responsible for controlling the mobility of UEs 112 located in the coverage area of the E-UTRAN. The S-GW handles the transmission of user data between the UE and the network.

Prior Art Access Control

Figure 2:
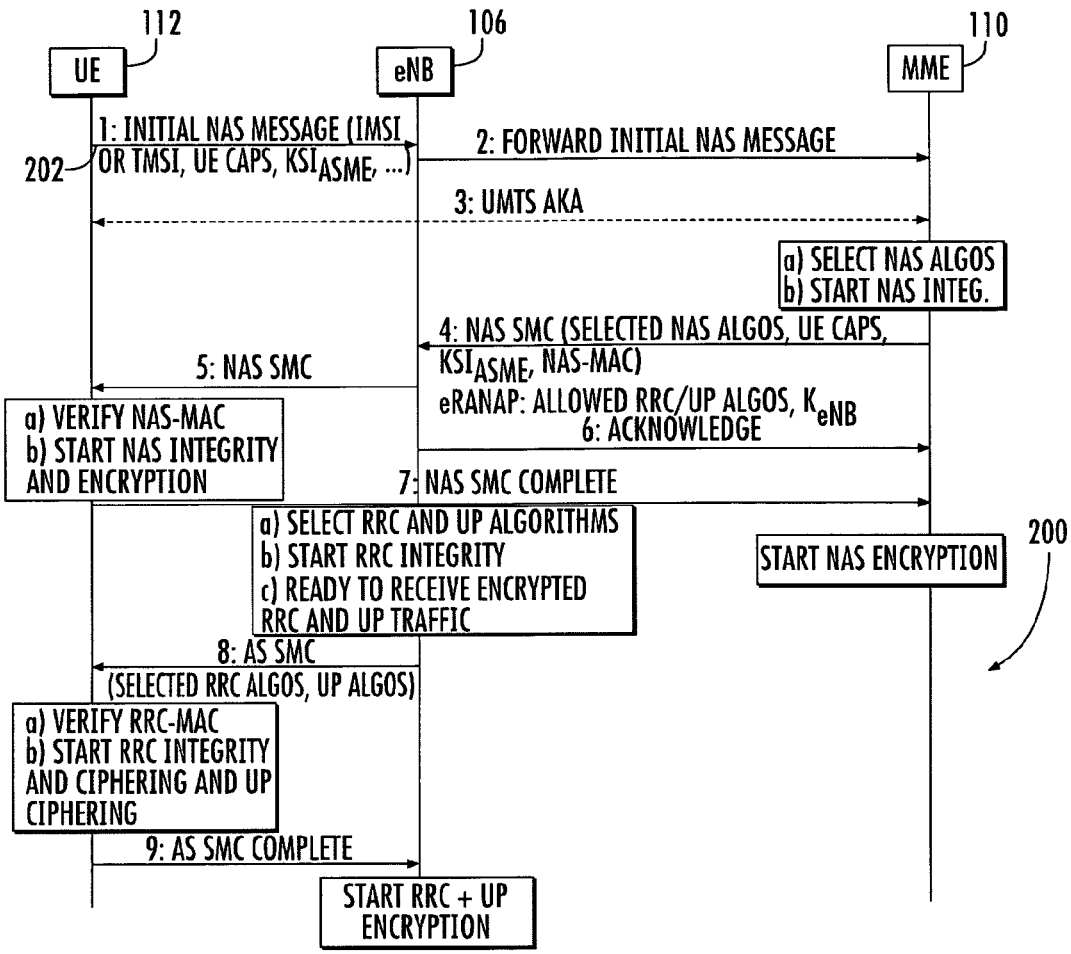
FIG. 2 is a graphical illustration of a typical prior art UMTS authentication and security setup procedure.

FIG. 2 illustrates the prior art access control scheme 200 for the exemplary 3G cellular networks, wherein access control is based on an authentication protocol called Authentication and Key Agreement (AKA). As previously noted, AKA is a challenge-response based mechanism that uses symmetric cryptography. In the UMTS implementation of AKA, the user equipment (UE) must first identify itself before the Core Network can initiate the challenge-response; the Core Network will then initiate a challenge process to the UMTS Subscriber Identity Module (USIM), which is preprogrammed with the AKA response protocol.

The USIM is resident to the UE 112, and it comprises the hardware and software apparatus required to unambiguously and securely identify the user to the network. The USIM typically resides on a smart card that can be inserted or removed from the mobile device and contains, inter alia, the permanent identity of the user, called the International Mobile Subscriber Identity (IMSI), and a shared secret key (used for authentication). The smart card is generally referred to as the UMTS Integrated Circuit Card (UICC). The USIM on the UICC card is provided by the service provider; hence even if the UICC card is moved from one UE to another, the service provider and service configuration remain the same. The importance of the IMSI identification to user privacy imposes specific protection measures, such that the subscriber identity is masked whenever possible.

The IMSI consists of Mobile Country Code (MCC), a Mobile Network Code (MNC), and a Mobile Subscriber Identification Number (MSIN). The total maximum length of IMSI is fifteen (15) digits, where the MCC is three (3) digits and MNC is typically two or three (2 or 3) digits depending on the area. From a subscriber's privacy point of view, the MSIN uniquely identifies the subscriber, and thus must be protected for confidentiality reasons. Unfortunately, the subscriber's credentials cannot be fetched before the subscriber has been properly identified. Thus, with the 3G AKA authentication method, the network cannot be authenticated (from the UE's point of view) before the UE has provided its own identification (202). Furthermore, because the UE must transmit its IMSI across the air interface, the UE must be able to recognize and reject plain text IMSI queries coming from an untrustworthy source. Additionally, public key cryptography or symmetric keys may be used to hide the IMSI.

The IMSI is sent as rarely as possible, to avoid being identified and tracked. The IMSI is only used when the mobile has just been switched on, or when the data in the mobile becomes invalid for one reason or another (e.g., superseded or expired). Otherwise, the network provides a Temporary Mobile Subscriber Identification (TMSI) for user identification. The TMSI is a randomly allocated number that is only valid within a given local geographic area. The network frequently changes the TMSI at arbitrary intervals in order to avoid the subscriber from being identified and tracked by eavesdroppers on the radio interface. While TMSI provides additional privacy to a user, the TMSI may only be granted after the IMSI has initially passed the AKA correctly. Therefore, even though the TMSI can minimize IMSI exposure after AKA, since the IMSI is the unique identifier for the UE, it is vulnerable during the initial AKA.

Subscription-Less Access—

Figure 3:
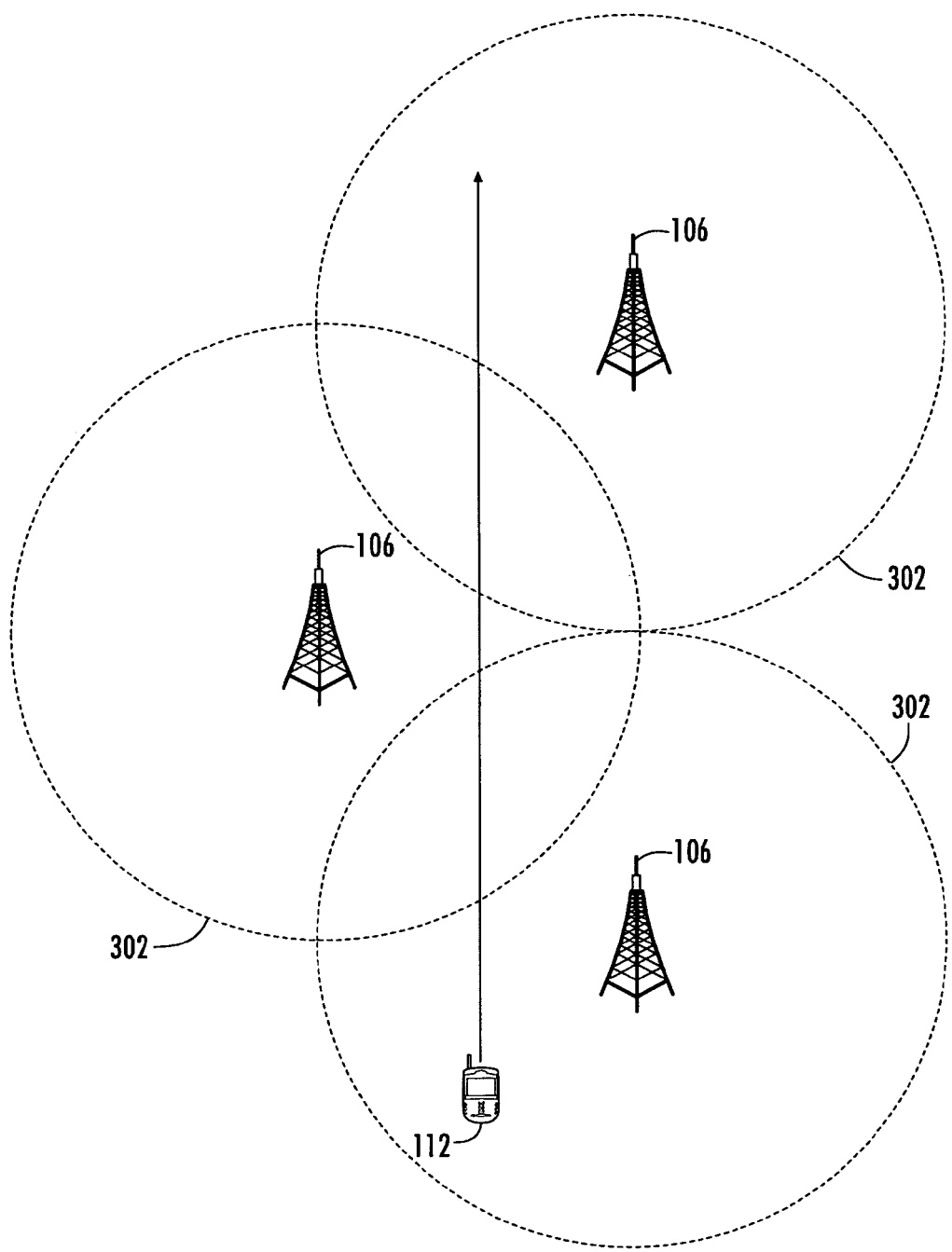
FIG. 3 is a graphical illustration of a mobile user device travelling through several subscription-less access coverage areas.

Unlike typical cellular access (as described above), subscription-less access is characterized by substantially less permanent and/or anonymous data transmissions. Referring now to FIG. 3, a UE 112 is shown travelling through several subscription-less access coverage areas 302 (such as might be found in a mall, when on a sidewalk stroll, etc.). Subscription-less communication is characterized by one or more of the following conditions: volatility (e.g., frequent changes), no necessity for permanent storage (e.g., localized advertising, etc.), anonymity (no security key), and privacy.

Subscription-less data services may be useful in a wide variety of possible scenarios; for example, any wireless network host may provide disposable media (e.g., advertisements, broadcasts, multicasts, user incentives, etc.) via a subscription-less service. Ideally, wandering users can consume such services without any long term commitments (e.g., contracts, minimum required service periods, etc.). A number of various commercial scenarios are envisioned for use with cellular or other wireless subscription-less access; see discussion of business methods and rules engine provided subsequently herein.

Unfortunately, in the framework of the prior art cellular access control methods, each time the UE 112 moves from one subscription-less area 302 to a new area, the UE re-initiates registration (see FIG. 2) prior to receiving the subscription-less access. The corresponding traffic necessary to affect such repeated registrations can be detrimental on multiple levels. Firstly, the UE must repeatedly transmit its IMSI over the air (202; see FIG. 2); such frequent exposure of sensitive user information is undesirable. Secondly, in some scenarios, the subscription-less service may be provided by a third party such as a femtocell operator (a femtocell is a simple base station operated by a third party to improve localized cellular service). For similar reasons, it is undesirable to provide user information (such as the IMSI) to a third party operator. Thirdly, the UE and the Core Network entities (e.g., MME, HLR, etc.) must engage in frequent, extended message exchanges. These authentication processes are expensive in terms of both network resources and device computation/processing overhead. Other reasons of why to avoid such repeated registrations (e.g., ostensibly greater mobile device power consumption, etc.) will be readily apparent to those of skill in the arts.

Accordingly, the benefits associated with the prior art access control methods of cellular networks are not necessary, and in some cases detrimental to, subscription-less operation. Desirable qualities for subscription-less access include: (i) entity-to-entity (i.e., peer entity) authentication, (ii) maintenance of data integrity, (iii) maintenance of confidentiality, and (iv) user anonymity and privacy.

It is also readily appreciated that other data transmission methods and network architectures may have similar characteristics to the aforementioned subscription-less access paradigm. For example, ad hoc networks such as public Wi-Fi hotspots have very similar anonymity and authentication requirements. As another example, data transmission methods such as Multimedia Broadcast Multicast Services (MBMS) may benefit from reduced authenticated anonymity requirements. As yet another example, E-911 (emergency calls) are typically ad hoc and/or subscription-less, but require some degree of authentication and authorization. Various aspects of the present invention would enable CSG (Closed Subscriber Group) femtocell ad hoc emergency service to any UE (i.e., even UEs which do not belong to the CSG group).

Channel Impulse Response (CIR)—

Figure 4:
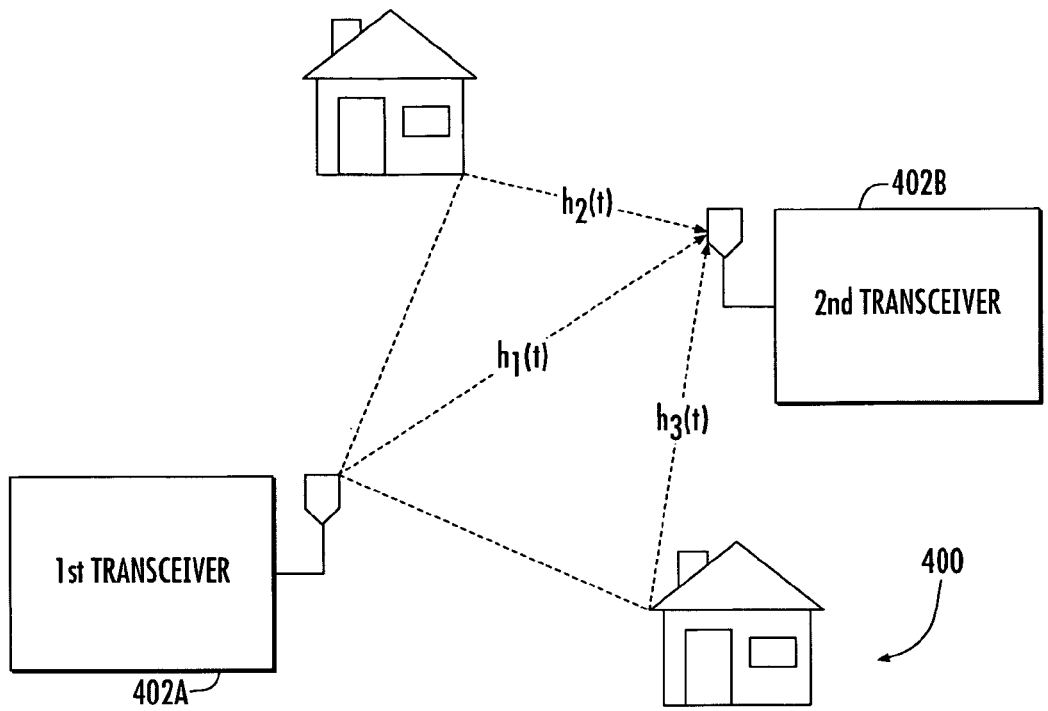
FIG. 4 is a graphical illustration of a multipath environment between two transceiver devices useful for illustrating the various quasi-unique properties of multipaths useful with the present invention.
Figure 5:
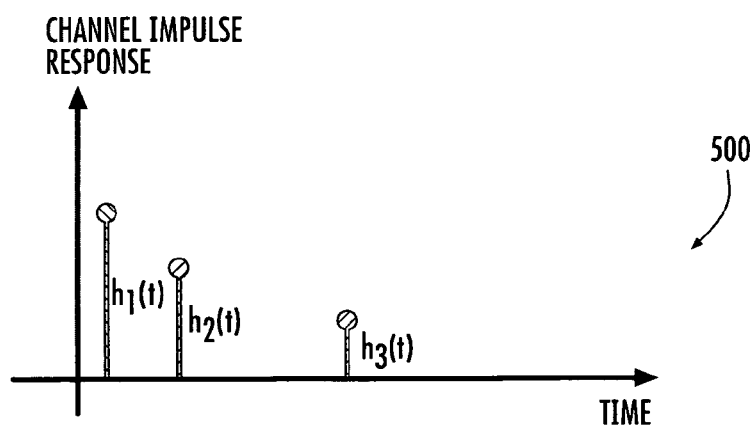
FIG. 5 is a graphical representation of one exemplary Channel Impulse Response as represented in the time domain.

FIG. 4 depicts one exemplary radio environment 400 comprising a first transceiver 402A, a second transceiver 402B, and a multipath radio link, useful for illustrating various aspects of the present invention. The radio environment 400 has a unique waveform propagation profile between the first and second transceivers. Three (3) different radio paths (collectively referred to as a multipath) are shown between the first and second transceivers. As illustrated in FIG. 5, the multipath characteristics 500 can be symbolically demonstrated with a Channel Impulse Response (CIR), where a hypothetical impulse transmitted from the first transceiver is represented with its incident response at the second transceiver at a time delay.

Figure 6:
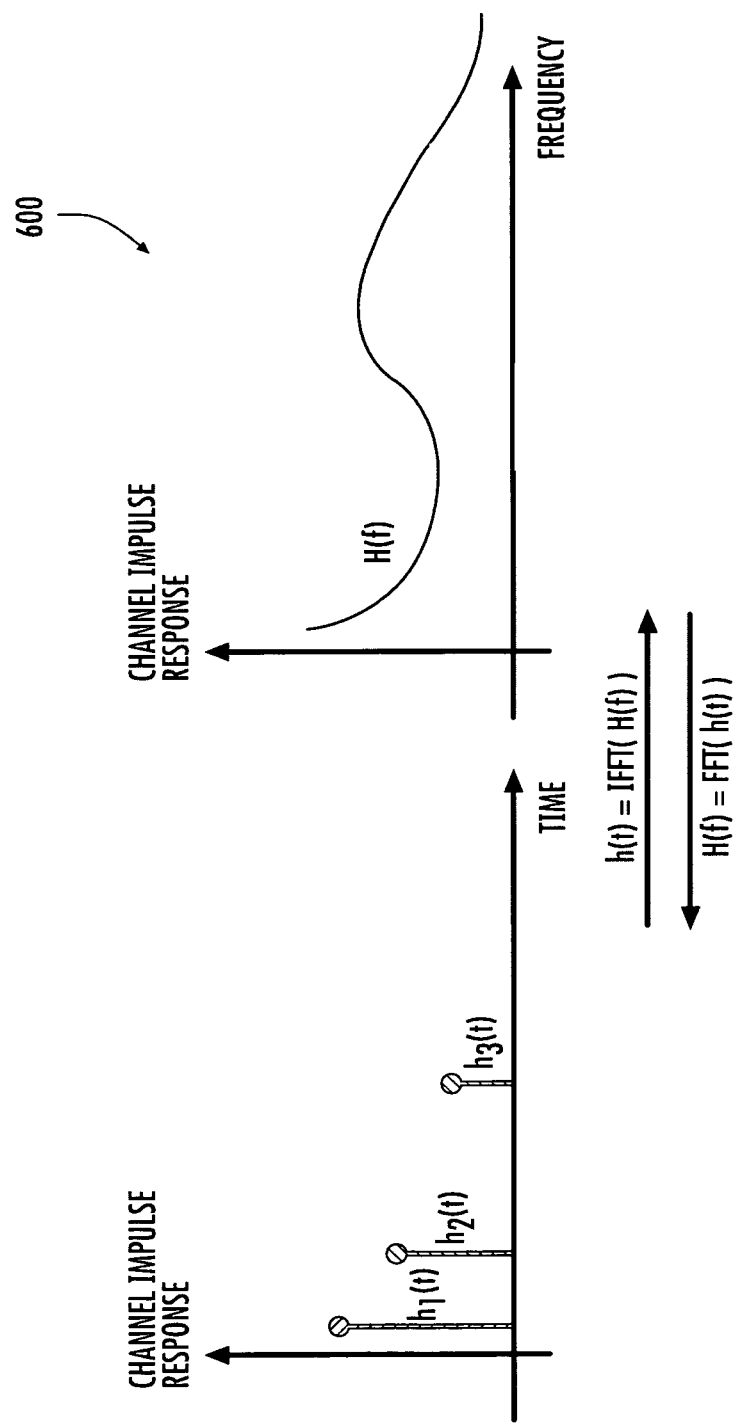
FIG. 6 is a graphical illustration of the relationships between the time domain and frequency domains, and their application to Channel Impulse Response in accordance with the present invention.

Moreover, the CIR 500 may be represented in both time and frequency. FIG. 6 illustrates a conversion between a time domain CIR and a frequency domain CIR. The time domain CIR is represented with the transfer function h(t), and the frequency domain CIR is represented with the transfer function H(f). The time and frequency domain are related to one another by the Fourier Transform (e.g., FFT), and Inverse Fourier Transform (e.g., IFT). The two domains for CIR representations are mathematically equivalent, and may be used interchangeably. However implementation-specific considerations may govern CIR domain representation. For example, in OFDMA implementations, demodulation is performed within the frequency domain and thus the frequency domain CIR is generally used. Conversely, CDMA implementations may track time domain "fingers" thus, a time domain CIR may be more easily implemented.

The Channel Impulse Response 500 between two transceivers 402 has several important properties: i) uniqueness, ii) reciprocality, and iii) randomness, each of which is now described in greater detail.

i) Uniqueness of Multipath OTA Channels—

A "unique" multipath is distinguishable from all other multipaths. As shown in this illustrative example (FIG. 4), the first transceiver 402A has a direct path to the second transceiver 402B via a "line of sight" represented with $h_1(t)$. Two secondary paths are shown, represented with transfer functions $h_2(t)$ and $h_3(t)$ respectively. Each of the transfer functions $h_x(t)$ represents the transmission channel delays, attenuation, and phase shift characteristics specific to the path. Channel characteristics have a wide number of contributing factors. For example, common examples of predictable factors are design of the RF frontend, distance of propagation, etc. Unpredictable factors may be caused by internal device noise, external device noise, weather, reflection surfaces, movement, etc.

While channel characteristics are not truly "unique" in the strict mathematical sense, in virtually every practical implementation, the multipath signature is unique among the base of users. The multipath characteristics between a transmitter and a receiver depend on their geographic locations, the very specific surrounding elements (e.g., houses, metallic items, etc.), and the device's location with respect to the elements. Thus, even a small difference (on the order of a few millimeters) can impact the multipath characteristics significantly. The probability of two distant devices having exactly the same surrounding elements, positioning, etc. is extraordinarily unlikely, so as to for all intents and purposes never occur in practical use. Thus, uniqueness (or quasi-uniqueness) is virtually guaranteed. As used herein the terms "uniqueness", and "quasi-uniqueness" refer to any communications link having substantially unique channel characteristics in both transmit and receive directions.

ii) Reciprocality of Multipath OTA Channels—

Multipaths have identical characteristics in both forward and return directions. Referring back to FIG. 4, the illustrated forward path from the first transceiver 402A to the second transceiver 402B is physically identical to the return path (i.e., from the second transceiver to the first transceiver). The following discussion provides a brief description of the limitations on "reciprocality" of the multipath OTA channels.

Radio channels are intrinsically commutative (i.e., order does not matter). For example, attenuating an RF signal by 3 dB (roughly one half), and 10 dB (roughly one tenth), has a net result of 13 dB (roughly one twentieth). Accordingly, the channel effects experienced by a first transmitted signal along a first path are identical to the channel effects experienced by a second transmitted signal in the reverse direction of the first path. In practical implementations, this assumption is not entirely accurate, as receive and transmit paths may be slightly different in various radio technologies. For example, some attenuation effects may be frequency dependent (e.g., rain fade affects higher frequency channels at greater levels than low frequency channels, etc.). Thus transceiver systems 402 which have distinct receive and transmit frequencies (e.g., Frequency Division Duplex (FDD), etc.) may exhibit slight differences in attenuation.

Radio channels are also time invariant. Time invariant systems do not exhibit hysteresis, or "memory". For example, a radio channel which sends a time invariant impulse at time $T_1$ and $T_2$ will have identical outputs at shifted times. In practical implementations, the radio environment is not perfectly time invariant. Certain environmental factors can affect delay and attenuation over time. Even though some channels characteristics may exhibit drift (e.g., due to movement, weather changes, etc), many of these effects are rendered insignificant due to the data rate of current technologies.

Despite some minor variations due to practical implementation, the reciprocality of the multipath between the first transceiver 402A and the second transceiver 402B ensures that the CIR 500 of the forward path will be "substantially" identical to the CIR of the return path. As used herein, the terms "symmetric", "reciprocal", and "bidirectional" refer without limitation to any communications link having substantially similar channel characteristics in both transmit and receive directions.

iii) Randomness of Multipath OTA Channels—

One intrinsic property of multipath profiles (and other transmission characteristics) is their inherent unpredictability. As previously mentioned, the transfer function of a transmission channel is simultaneously influenced by multiple truly random events such as internal device noise, external device noise, weather, reflection surfaces, movement, etc.

Multipath characteristics are highly localized. The cumulative effects of multipath interference are unique to within a single wavelength (e.g., around 15 cm for 2 GHz frequency). The difference of just a single wavelength causes different reflections, propagation delays, and phase changes and attenuations. Accordingly, even two UEs 112 separated by meter will experience significantly different multipath effects. Understandably, UE movement further enhances the unpredictability of multipaths.

Example Operation—

The following discussion illustrates various useful aspects of the present invention by combining the unpredictable properties of multipath over-the-air (OTA) channels with the exemplary cellular architecture, to provide anonymous subscription-less data services.

Figure 7:
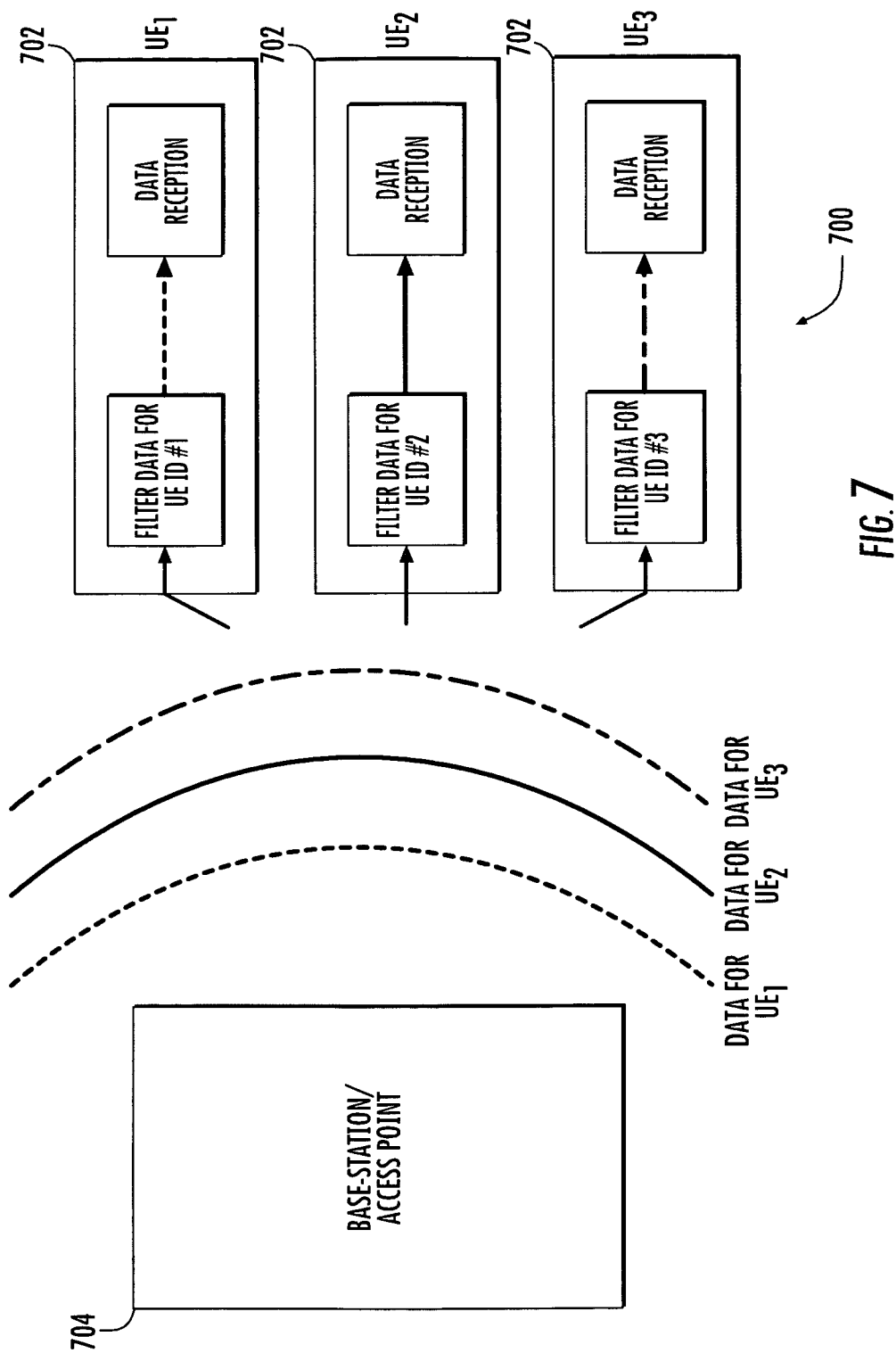
FIG. 7 is a high level diagram of one exemplary cellular network comprising a base station and three (3) user equipments, where the base station is providing subscription-less data services for each of the user equipment, in accordance with the present invention.

Referring now to FIG. 7, a cellular communication system 700 exploits a wireless link between User Equipment (UE) 702 and Base-Station (BS) 704. Each communication link requires a Unique ID. To maintain anonymity, only the UE and the Base-Station should maintain the same user ID. For reasons previously cited, the ID assignment is preferably not transmitted over the air interface.

Unlike the prior art (e.g., UMTS AKA, etc.), the present invention provides significant improvements by inter alia, firstly avoiding communication overhead and latency required for a BS 704 to assign a User ID to a device 702. Secondly, the present invention assigns a User ID without transmitting any user information (e.g., IMSI, etc.) over the air. The newly assigned user ID has no identifiable tie to the actual subscriber, and is more appropriately a "pseudonym" or proxy user ID.

In one exemplary embodiment of the present invention, the momentary Channel Impulse Response (CIR) 500 for the multipath between the UE 702 and BS 704 is used as pseudonym identification. Referring back to the unique properties of the CIR, the pseudonym will suitably provide a truly random user ID which cannot be "guessed" by any malicious third parties. In fact, such a pseudonym based on the CIR is completely anonymous, even to the BS operator. Furthermore, due to the reciprocal properties of the multipath OTA channel, both BS and UE will have substantially identical pseudonyms for one another, without any significant message exchange. Such "blind detection" and assignation of user identification (or proxy identification) is especially useful for reducing message exchanges.

In one embodiment, the pseudonym is derived from the momentary CIR 500 between the BS 704 and the UE 702. Once both devices have sent data, the CIR can be estimated by each device independently of the other. Furthermore, any information transmitted between the two entities may be used regardless of the information content; channel estimation may be piggybacked on the data of the transmission, effectively combining user identification activity with virtually any other transaction.

In the foregoing exemplary user access scheme, practical problems relating to, inter alia, the quality of the radio channel, etc. may complicate operation. In current implementations of radio technology, significant amounts of distortion may be caused by thermal noise, radio channel fluctuations, and movement. Higher quality components are generally less susceptible to such effects, but are associated with significantly higher cost. Moreover, unlike other dialog based user identification methods, "blind detection" of user identity is a "one-shot" process, and is performed without further message exchange.

Even though the channel is symmetric, real world effects and commercial design constraints may induce small differences between the CIR estimates of the UE 702 and BS 704. Accordingly, in one exemplary embodiment, the CIR based pseudonym is adjusted to reduce quantization granularity. Bit errors generally (e.g., caused by thermal noise, etc.) occur between neighboring quantization levels (typically directly above or below the true value); reducing the quantization level increases the probability of correct quantization. In other embodiments, the CIR based pseudonym has an associated "level of tolerance". The level of tolerance is adjusted (either statically, semi-statically, or dynamically) to current noise margins, and adds some degree of leniency to proxy user ID interpretation. For example, if the proxy user ID's degree of error is within a tolerable range, the receiver device will assume that the ID is correct.

Briefly, it should be noted for clarity, that as used throughout, the level of tolerance and quantization granularity are two (2) distinct processes, which when combined address various implementation specific issues. As will be readily appreciated by those skilled in the arts given the contents of the following disclosure, in many situations quantization granularity can be interchangeably used with the level of tolerance as a design choice i.e., a larger quantization granularity is equivalent to larger levels of tolerance, and vice versa. A distinction can be made as to when such processes occur. For example, quantization occurs during the determination of the pseudonym or user identity. In contrast, the level of tolerance is used to determine equivalency of a pseudonym with user identification. Thus, in certain embodiments, a higher degree of granularity may be preferable (such as with a low cost radio transmitter having poor receptivity). Or, in other embodiments, a higher level of tolerance may be preferable, such as for high mobility (where noise affects some paths more than others).

Co-owned and co-pending U.S. patent application Ser. No. 12/567,412 entitled "METHODS AND APPARATUS FOR COMPENSATION FOR CORRUPTED USER IDENTIFICATION DATA IN WIRELESS NETWORKS" filed concurrently herewith, which is incorporated herein by reference in its entirety, discloses additional error tolerance and quantization schemes useful in conjunction with one or more aspects of the present invention, although it will be recognized that other approaches may be used as well.

At a high level, the UE 702 detects a subscription-less service capability from the BS 704 and requests one or more subscription-less services of interest from the BS. The BS receives the subscription-less access attempt from the UE and estimates a communication channel, thereby deriving a pseudonym for the UE. The BS provides the requested service via broadcast, multicast, unicast, point-to-point communication, etc., where the requested service is additionally identified with the derived pseudonym. The UE receives the service data, and estimates the communication channel to derive its copy of the pseudonym. If the UE's derived pseudonym matches the requested service's BS pseudonym (within prescribed limits or criteria), then the UE consumes the service data.

Figure 7A:
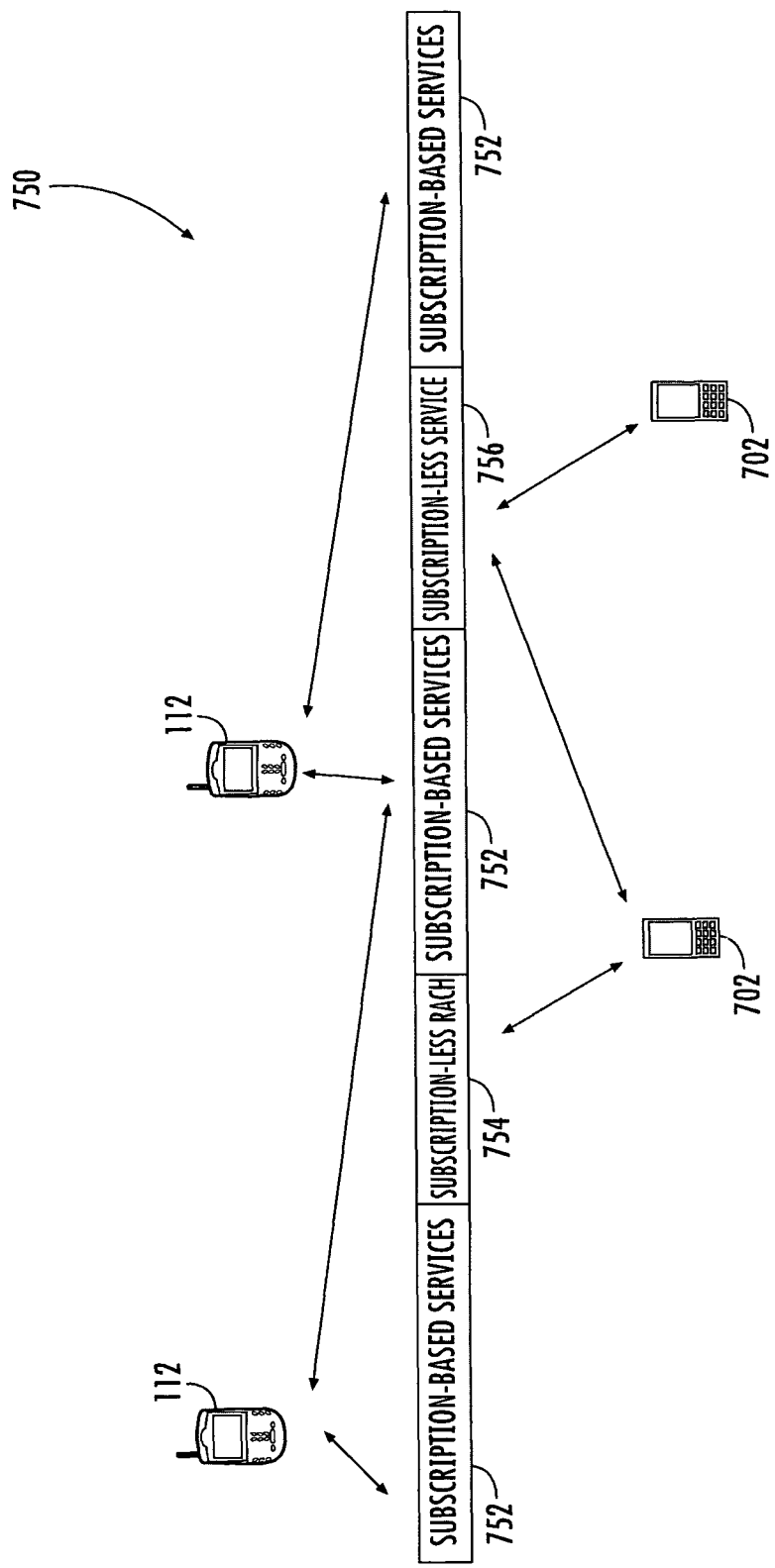
FIG. 7A is a graphical illustration of one exemplary embodiment of the subscription-less Random Access Channel (RACH) in accordance with the present invention.

Subscription-less data services generally coexist with subscription-based data services, FIG. 7A illustrates one coexistence approach 750 for subscription-less and subscription-based services for use with the aforementioned scheme. In the illustrated embodiment, subscription-based services 752 are cyclically interrupted for subscription-less service frames (754, 756). As shown, subscription-less service is accessed in two stages. First, the enabled UE 702 accesses a subscription-less RACH channel 754. The network estimates the corresponding channel impulse response and derives the corresponding user ID or pseudonym (as previously mentioned). Thereafter, both subscription-less and subscription-based data services are provided to the coexistence community of users. During subsequent transmissions, the enabled UEs 702 estimate their communication channels and determine their user IDs. Each enabled UE's derived pseudonym is compared with the BS pseudonym contained in the transmitted frame; if the pseudonyms match, then the enabled UE decodes the data contained in the frame 756. UEs 112 with subscription-based services can operate normally.

Methods—

Generalized methods for provisioning data services based on associations derived from radio channel characteristics are now discussed in greater detail. Furthermore, while discussed in relation to access control, it is readily appreciated that the invention may more broadly encompass any management of the logical link between a source transferring data to a sink. Such logical link management generally includes: access control, network addressing, service provisioning, content classification, session connection, etc.

Figure 8:
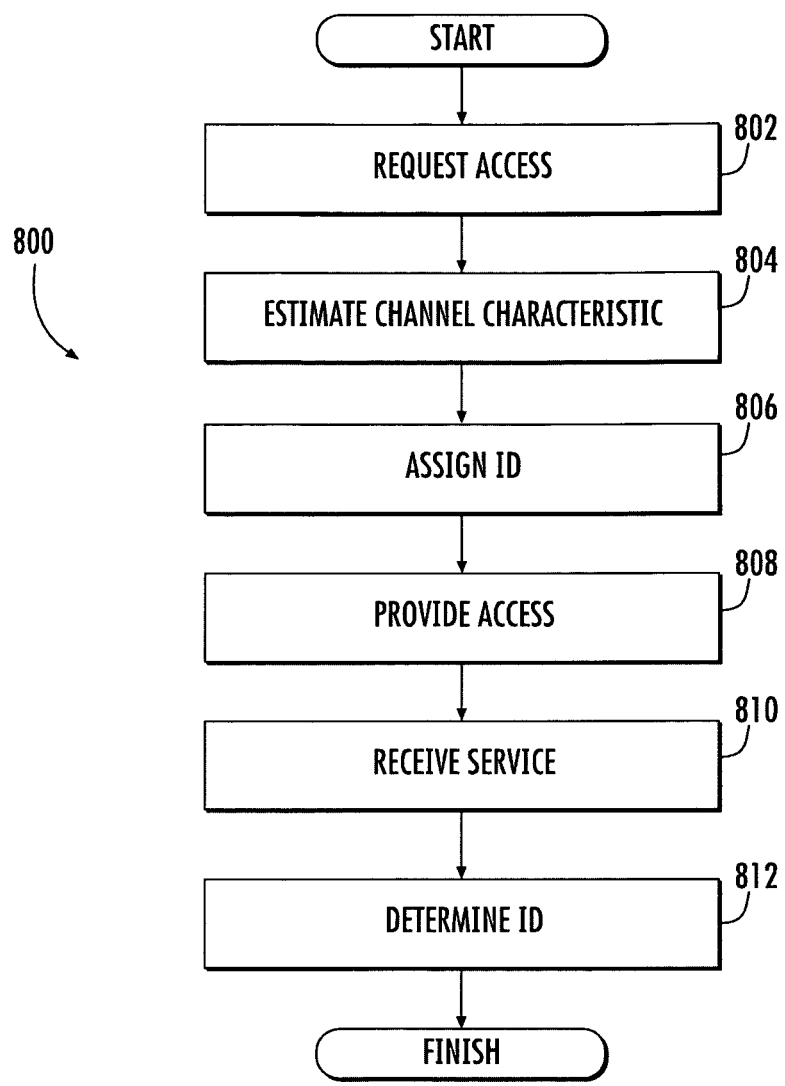
FIG. 8 is a logical flow diagram of an exemplary embodiment of the generalized process for dynamic user identification, in accordance with the principles of the present invention.

Referring now to FIG. 8, one embodiment of a generalized association procedure 800 executed in accordance with the principles of the present invention is illustrated. The operative elements as described with respect to the methodology of FIG. 8 are: (i) a requester device, and (ii) a provider device. In some embodiments, the requester and provider devices may have different device capabilities, such as is common in cellular networks (e.g., a UE 702 and a BS 704, a Wi-Fi client and access point (AP), etc.). In other embodiments, the requester and provider devices are peer devices; each having substantially identical device capabilities, such as is common in ad hoc networks (e.g., two WLAN peer devices, certain types of PAN devices, "walkie-talkie" type devices, etc.). It is appreciated that in the foregoing examples, each device my act as both a provider and requester (i.e., roles can be reversed), whether simultaneously or at different times.

At step 802, the requester requests access from the provider. In one exemplary embodiment, the provider is broadcasting a generalized message advertising its presence to nearby requester devices (and perhaps one or more services or consumables or "products" that it is offering). In other embodiments, the requester "blindly" attempts access to nearby providers without any a priori knowledge of the provider or its services.

For example, in a cellular network, the BS 704 (provider device) typically broadcasts a control channel which indicates one or more subscription-less data services (e.g., such as via a Broadcast Control Channel (BCCH), etc.). Initially, the UE 702 demodulates the control channel information. If the UE determines that the subscription-less service is of interest, then the UE requests access to the subscription-less service (e.g., such as via a Random Access Channel (RACH), etc.). In one exemplary aspect, a subscription-less access-request-field is introduced in the communication framework during which access is possible prior to any information exchange between UE and BS. Recall that subscription-less data access is performed without any accounting; thus, once this request is successfully performed without typical registration procedures, the Broadcast/Multicast service may be immediately started.

In another example, in an ad hoc wireless network, a first WLAN access point (AP) supports one or more subscription-less data services, but does not actively broadcast its support. A nearby passer-by reading a billboard sign, or similar posted advertisement (or as alerted by an electronic device such as an application running on the user's smartphone), determines that they would like to receive the service. The user initiates a request via his WLAN client device (which may or may not be the same device as the aforementioned smartphone).

In one embodiment, the request may be explicit, such as a request for specified services. For example, an access point may provision various "canned" programs (e.g., TV shows, movies, commercials, infomercials, etc.), which are requested by an explicit identifier. In alternate embodiments, the request may be implicit, such as a request which triggers an automatic subscription-less service. For example, a small business owner may always transmit a subscription-less service. The mere presence of a UE transmitting a RACH (enabled or not) triggers a commercial broadcast on a subscription-less channel. If a UE is appropriately enabled, and interested (which may be determined e.g., via a configuration menu or other user interface on the UE), the UE will configure itself for the commercial.

In one variant, the request may be for an override service, such as an E-911 call. E-911 calls are admitted network access, regardless of user authorization, authentication, and accounting.

In one exemplary embodiment, the request message does not provide any information as to the requester's identity. Such a request message may be used to preserve user anonymity. Alternately however, the access request may explicitly identify the user in a format and type that is recognized by the provider.

At step 804, the provider receives the request, and estimates a channel characteristic which is specific to the requester device. In one exemplary embodiment, the provider estimates a Channel Impulse Response (CIR) 500, comprising any one or more representations of multiple magnitudes, phases, frequencies, time delays, spatial diversities, etc. of the requesting device. In one variant, the Channel Impulse Response includes a representation of received signal magnitude as a function of time. Other common representations include representations of signal magnitude as a function of frequency, etc.; however it is appreciated that myriad channel representations could readily be substituted. In one embodiment, the Channel Impulse Response is produced as an output of a rake receiver (e.g., a table of "fingers", where each finger is represents the result of a correlator, at a time offset). In another embodiment, the Channel Impulse Response is an output of a FFT (e.g., a table of spectral energies, at frequency offsets).

While the following discussion refers to Channel Impulse Responses represented with respect to magnitude, it is appreciated that other types of channel characteristics could easily be substituted by one having ordinary skill in the arts, given the contents of the present disclosure. For example, in one embodiment, the channel characteristics may be an array of distances between time domain channel impulse response components (i.e., where the relevant characteristic is a time difference, rather than a magnitude difference). In another embodiment, a listing of phase differences of the received signal in time and/or frequency domain may be used. In fact virtually any combination or set of channel characteristics could be used, provided that the channel characteristics are sufficiently unpredictable to an outside observer, and that the channel characteristics have reciprocal properties at both the transmitter and receiver.

Moreover, while certain channel characteristics may be directly used, some channel characteristics have important properties when further processed. For example, differential values of a channel impulse response may have distinct noise compensating properties. For instance, differential and relative calculations may be useful in fading channels which affect the transmission path. Consider, a first path which is twice as powerful as a second path, will remain twice as powerful even as fading changes. Thus, a relative representation (such as a fractional, or percentage) of the channel impulse response has substantial resistance to fading effects. Similarly, a first path which is higher than a second path retains this difference, even when the noise floor increases. Thus, a differential representation (such as a difference, or subtraction) of a first and second path is resistant to noise floor changes.

Other signal processing operations are well known to those skilled in the art, given the contents of the present disclosure.

Figure 9:
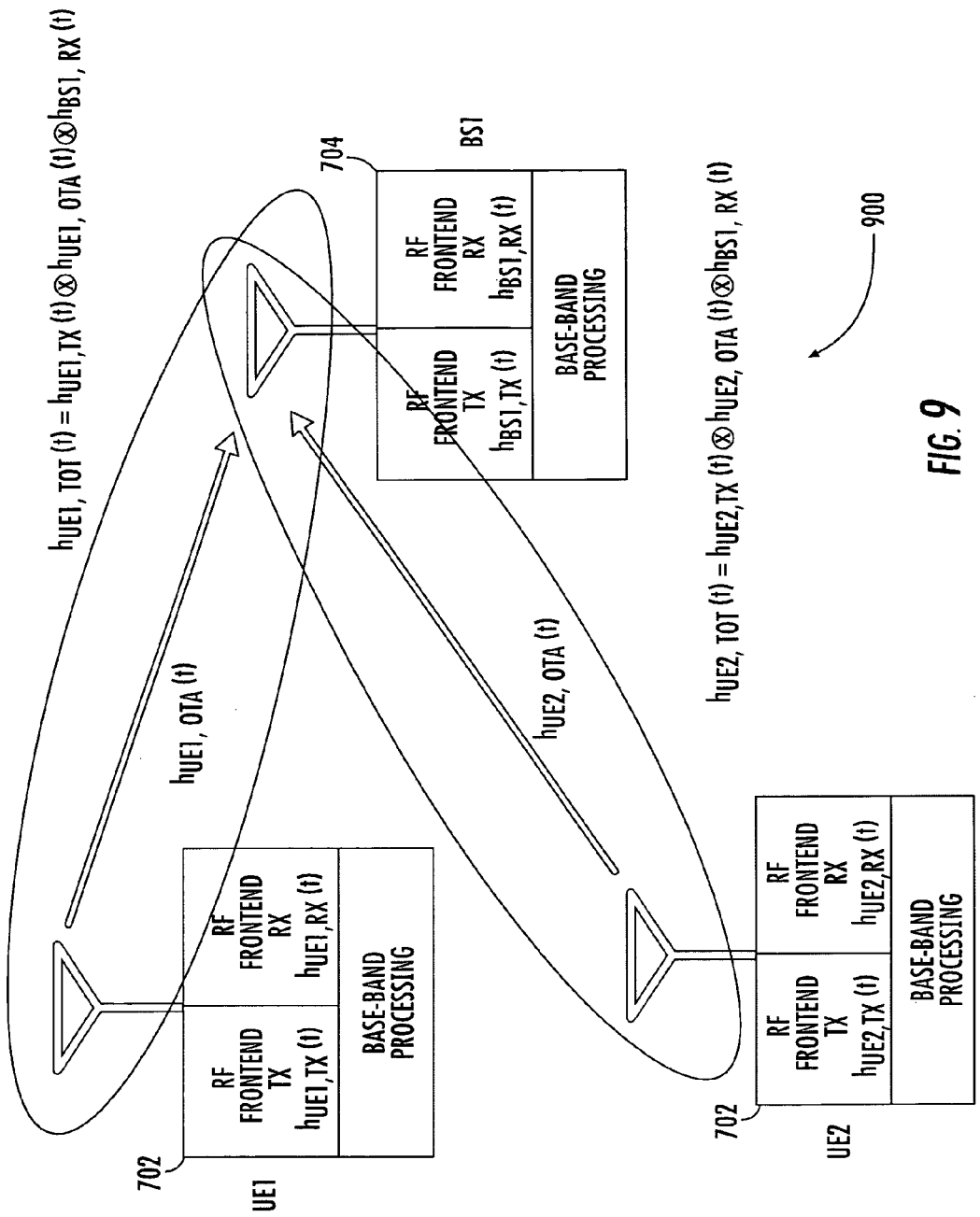
FIG. 9 is a graphical illustration of one exemplary embodiment of the reverse link illustrating the aggregate Channel Impulse Response in the reverse direction, in accordance with the present invention.
Figure 9A:
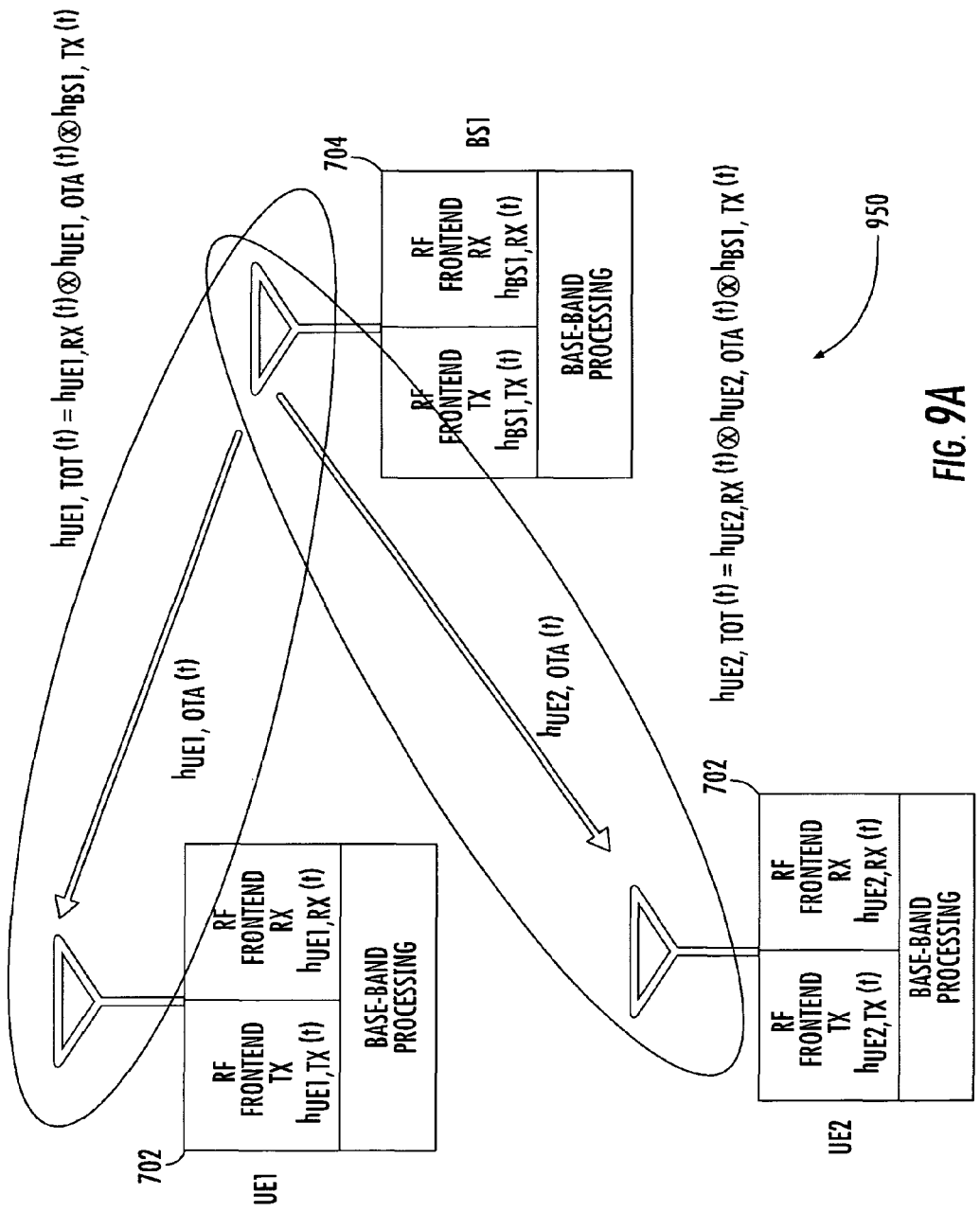
FIG. 9A is a graphical illustration of one exemplary embodiment of the forward link illustrating the aggregate Channel Impulse Response in the forward direction, in accordance with the present invention.

FIGS. 9 and 9A illustrate one exemplary high-level cellular radio system comprising two UEs 702 and one BS 704 entity.

Each of the entities has a Transmit and Receive RF frontend having a characteristic impulse response 500 (i.e., UE1 has the CIRs $h_{UE1,TX}(t)$, $h_{UE1,RX}(t)$; UE2 has the CIRs $h_{UE2,TX}(t)$, $h_{UE2,RX}(t)$; and BS1 has the CIRs $h_{BS1,TX}(t)$, $h_{BS1,RX}(t)$). The characteristic impulse response of each RF frontend is predominantly determined by design implementation, component tolerances, etc. Furthermore, the OTA link has a characteristic impulse response which is unique to each multipath. As is well known throughout the radio transmission arts, the overall path from each UE to the BS (and return paths), is calculated by convolving the CIRs of the RF frontends, and the OTA channels. In alternative embodiments, this calculation may be done in the frequency domain using simple multiplication. FIG. 9 illustrates the aggregate CIR in the reverse direction (UE to BS) 900, and FIG. 9A illustrates the aggregate CIR in the forward direction (BS to UE) 950.

In one exemplary embodiment, the channel impulse characteristic is approximated with one or more quantization steps. The provider performs a standard quantization of the received channel gains. Such quantization may include for example generalized rounding, ceiling rounding, and/or floor rounding, etc. Similarly, rounding may take into account "hysteresis" (or state memory). While radio channels do not exhibit hysteresis themselves as previously noted, temporary changes to a channel may cause erratic glitches which can be ignored. Hysteresis is also useful for settling "cusp" values during rounding (e.g., the midpoint is a cusp value for general rounding and may cause jitter effects as the value jumps between the two neighboring values). See, e.g., co-owned and co-pending U.S. patent application Ser. No. 12/567,412 entitled "METHODS AND APPARATUS FOR COMPENSATION FOR CORRUPTED USER IDENTIFICATION DATA IN WIRELESS NETWORKS" previously referenced herein, for exemplary quantization schemes useful with the present invention.

In one variant, the degree of quantization is selectable. For example, a time domain CIR 500 having a relatively high signal-to-noise ratio (SNR) will have many distinct multipath peaks. In contrast, a time domain CIR of relatively low SNR will have multipath peaks which are muddled together.

Similarly, a frequency domain CIR having a relatively high signal to noise ratio will have many high gain peaks across a range of carriers (e.g., a "Bart's head", etc.), where low SNR will have a shallow or irregular gain peaks across a range of carriers. A high SNR radio environment is capable of supporting a large number of requesting devices. A high SNR environment should exhibit distinct multipath signatures which are easily distinguished even among many users. Similarly, a low SNR radio environment may be near capacity, and generally cannot support many users at all. The provider may postpone communication with the requester, rather than use a muddled (and potentially confusing) multipath. Accordingly, in one such variant, higher accuracy quantization is used in high-SNR environments, whereas lower accuracy quantization is used in low-SNR environments.

In one embodiment, the provider selects a "fixed" portion of the channel characteristics for quantization. For example, in an OFDMA system, the quantized coefficients of the CIR of the entire bandwidth (e.g., the received spectral energy for each subcarrier) may represent the path from the UE to the BS. In an alternate embodiment, the provider dynamically selects a portion of the channel characteristics for quantization. For example, in an OFDMA system, the quantized coefficients of the CIR for only a portion of the entire bandwidth (e.g. only the pilot channel, etc.) are used to represent the path from the UE to the BS.

In one variant, the dynamic selection of channel characteristics may be related to the channel characteristics themselves. For example, in a high SNR environment, the provider may elect to use more complex quantization methods, as the CIR will be relatively robust. Conversely, in a low SNR environment, the provider may simplify the quantization.

In an alternate variant, the dynamic selection of channel characteristics may be related to the current number of connected requesters. In one embodiment, the provider may desire to select more complex quantization when it is servicing a greater number of users, or simpler quantization when servicing fewer users. The degree of quantization is therefore in this variant, directly related to the number of requesters the provider can support (see step 806 discussed below).

In one exemplary embodiment, in addition to the channel impulse characteristic determination, the provider also identifies one or more parameters related to quality of reception. Such parameters may be for example directly inferred from the channel impulse characteristic. In one such implementation, the quality or reception is calculated by: (i) directly summing the magnitudes of the peaks in a CIR profile, and (ii) comparing the result to a threshold value. Due to the difference in representation, the time domain and frequency domain results of a summation will differ, and may require different thresholds. For example, a frequency domain summation is likely to produce a high degree of granularity (due to the number of subcarriers). In contrast, a time domain summation is a simple calculation (i.e., a sum of two (2) or three (3) values). Accordingly, the present invention contemplates both (i) use of different thresholds which are optimized or adjusted for time or frequency domain representations (to include dynamic or time varying adjustment as applicable), and/or (ii) use of both time and frequency domain representations in a complementary fashion (e.g., to help resolve ambiguities, in a combinational fashion, and so forth). The previously mentioned alternate representations of time, frequency, differential magnitudes, etc. can be similarly applied for reception quality.

In alternate embodiments, such parameters may be indirectly inferred from one or more other secondary calculations. For example, in one embodiment, the coefficients of the CIR may undergo further modification to provide varying degrees of desirable weighting, such as: (i) summing the square roots of the coefficients of the CIR so as to reduce the impact of outlying coefficients (e.g., favoring consistent values such as may be useful in the frequency domain), or (ii) summing the squares of the coefficients of the CIR so as increase the impact of peak coefficients (e.g., accentuating peaks such as may be useful in the time domain). In another example, such parameters may be indirectly inferred from one or more other secondary calculations, such as Bit Error Rate (BER), Signal-to-Noise Ratio (SNR, etc).

The link quality parameters derived in step 804 indicates the likelihood of error in estimating the Channel Impulse Response. The noisier the channel, the more likely the CIR between the UE and the BS will differ. Thus, higher noise necessitates greater degrees of quantization or tolerance. For example, a high quality link between a UE and a BS will have a steady multipath signature. In contrast, a poor link between a UE and a BS will cause the UE and BS to measure different CIRs. The worse link quality will reflect in a wider variance in measured CIRs.

At step 806, the provider associates the requested data service with the momentary channel characteristics. The terms "associating", "association", "associates", etc. as used throughout, refer to the logical link between a source transferring data to a sink, rather than the mechanics of channel and error correction (e.g., channel coding, error correction, precoding, etc.). Associations generally encompass: access control, network addressing, service provisioning, content classification, session connection, etc.

In one exemplary aspect of the present invention, the provider manages the requester's access control to the data services with a temporary user identification based on momentary channel characteristics. In other aspects of the present invention, the momentary channel characteristics can be used as an identifier for session connections (i.e., semi-permanent messaging dialogs).

In one exemplary embodiment, the quantized CIR 500 is used to generate a pseudonym, where the quantized CIR comprises one or more discrete values (e.g., integer, discrete, or logical values). In other embodiments, the CIR may be used to generate a pseudonym, where the CIR comprises one or more continuous values (e.g., floating point values, etc.).

In one embodiment of the method, one or more channel characteristics are used to determine an overall link quality. For example, a CIR 500 which indicates strong reception may be considered less error prone than a CIR which indicates weak reception, and hence the level of quantization or tolerance may be adjusted accordingly (e.g., lower allowable quantization or tolerance for stronger reception case). The level of quantization or tolerance enables a provider and requester to use similar but not exact pseudonyms, where the difference is attributable to noise.

In another embodiment, the previously defined parameter(s) related to quality of reception is/are used for selection of modulation, and or coding scheme of the transmission. In one variant, the link quality is used to establish a "level of modulation complexity", for servicing the requester's request. For example, a CIR 500 which indicates "strong" reception (e.g., the sum of the multipath peaks exceeds a threshold, etc.) may be a candidate for high quality data services, whereas a CIR which indicates "weak" reception quality may be restricted to lower quality data services. For example, the quality of the link may be used directly to select the order of the constellation (BSPK, QPSK, QAM16, QAM64, QAM 256, etc.), with higher strength CIRs/links being used for higher constellation densities such as QAM 64 or QAM 256. Similarly, the quality of the link may be used directly to select the Quality of Service (QOS) of the link. In one variant of the method, the provider additionally determines if the requester should be allowed subscription-less data access. The decision for whether to provide support or not is based at least in part on, for example, one or more of: (i) the link quality, (ii) one or more identified channel characteristics, (iii) the requested data service, and/or (iv) the population of currently serviced users. The provider internally maintains one or more tables or other data structures which comprise a listing of quasi-unique pseudonyms and their corresponding data services. If the provider determines that the requester and its request may be feasibly supported (e.g., sufficient bandwidth, processing power, unique user ID, etc.), the provider updates its internal lookup table or tables with the pseudonym, and if available, any secondary IDs (e.g., owner-given ID, or user-given ID), current data services, and future access permissions.

In one embodiment, the decision to enable access to the user is based, at least in part, on the prospective pseudonym and the existing identifiers. In one implementation, the prospective user ID must not be ambiguous. For example, if a new requester has a multipath signature which has CIR magnitudes only slightly above noise (e.g., detected peaks do not exceed a minimum threshold), the provider may deny service until the requester has a sufficiently distinct signature. Similarly, in another implementation, if a pseudonym is identified as being insufficient for identifying the user, then the user is not granted service. For example, if a new requester has a multipath signature consisting of only a single path, the provider may deny service until the requester has a distinct signature.

In yet another implementation, if the user ID is already taken in the table, then the user is not granted access to service. While multipaths are almost always unique, as mentioned above, such uniqueness is not guaranteed. Thus, on rare occasions, it may be necessary to deny service due to a "duplicative" entity. This may include cases where the two IDs are not exactly identical, but could overlap due to quantization or tolerance. For instance, if one ID could feasibly vary over time into the tolerance range of another ID (and hence the second ID could also feasibly vary into the tolerance of the first), then a "collision" or ambiguity could occur, and the two IDs are potentially conflicting.

In one embodiment of the invention, a denial of a pseudonym is treated as a denial of service. Alternatively, denial of a pseudonym can merely be used to initiate the standard user identification process (e.g., UMTS AKA, and IMSI transmission, etc.), or some other process less onerous than the foregoing (e.g., wait and -retry protocols, switching one or more operational parameters and retrying, etc.). Thus, the disclosed invention may be used either in conjunction with, or in place of, the extant user identification mechanisms of the wireless bearer technology, as desired.

In yet another embodiment, the owner of the providing device (e.g., a femtocell hosting party, a WLAN operator, etc.) may be queried (such as via a graphical or other user interface) to allow the requester access to the network. The notification comprises the information that a new requester has attempted to connect to the provider, and the requested service if applicable. In this embodiment, the decision to allow access is predicated upon the owner's response to the query. In one variant, the owner may be asked to give each new requester a new "owner-given ID". This owner-given ID is recognizable by the owner, and can be for example a meaningful plain text ID and consist of ASCII symbols or XML, such that it could be human readable (e.g., "Peter's handheld", etc.). In another variant, the owner-given ID may be a graphic object or icon such as an avatar, such as e.g., a picture of a phone, a picture of the UE owner, a cartoon representation, etc.

The foregoing allocation of host-provided IDs may also be automatic in nature; e.g., according to a prescribed algorithm. For example, the algorithm might randomly generate IDs for use with different requesting users, or generate them according to a prescribed sequence, hierarchy, or order.

As another alternative, the decision to enable access to the user is based on a default operator setting (e.g. never allow access, always allow access). For example, the provider could be set in a closed mode where no new requesters are allowed. In this mode, the owner is not asked to add a new requester if they try to connect, and access is automatically denied. Alternatively, in an open or public mode, access is granted to every requester that is suitable (e.g., appropriate CIR levels, etc.). In yet another example, certain "privileged" uses may be always allowed, such as E-911 calls. Yet other schemes or access rules may be employed as well, such as for example open- or closed-access during certain periods of time or under certain operational conditions (e.g., when channel loading is light, access may be open).

At step 808, the provider uses the assigned pseudonym to provide the requested service to the requester. In one exemplary embodiment, this pseudonym is a user ID packaged with the data service. For instance, each packet of the requested data service is uniquely identified with the user ID. This user ID is only known now to the provider, since no other device knows of the channel impulse response 500 between the requester and the provider. Consequently, the user ID is untraceable, and completely anonymous. In another exemplary embodiment, this pseudonym is used as a seed for an encryption process. For instance, each packet of the requested data service is uniquely encrypted using symmetric key cryptography, using the "pseudonym" as the shared secret between the UE and the BS.

In one exemplary embodiment, the provider may acknowledge the request for data services, and provide a transmission of the multicast/broadcast services to the requester. In one implementation, the transmission is a subscription-less data transmission.

The provider may additionally broadcast optimization information useful for determining a pseudonym. In one variant, such information may directly apply or relate to the quantization of channel impulse responses or level of tolerance. For example, the provider may indicate that the time domain CIR should be quantized for pseudonym generation. Alternately, the provider may indicate that the frequency domain CIR should be quantized for pseudonym generation. Such information may also pertain to the degree of quantization, e.g., a range of time slots, frequencies, bases for pseudonym generation (for example, "only the best three (3) peaks are used for pseudonym generation", etc.), etc. In one variant, a cellular base station provides such information as part of a system information broadcast (SIB), or a master information block (MIB) described in greater detail hereinafter. In another variant, the information is embedded within the data transmission (e.g., in the payload of the message).

Within UMTS, the RRC sub-layer is used to broadcast System Information in the downlink channels; the specification governing RRC sub-layer operations is the 3GPP TS 36.331: "E-UTRA Radio Resource Control (RRC) Protocol", v8.2.0 (Release 8) which is incorporated herein by reference in its entirety. System Information (SI) is embedded within RRC messages carrying a plurality of System Information-Blocks (SIBs). There may be more than one System Information RRC message transmitted with the same schedule (and/or periodicity). Each SIB contains a set of related system information parameters.

Two special versions of System Information (SI) RRC messages (System Information Master (SI-M), and System Information 1 (SI-1)), only carry a single SIB, namely the MIB and the SIB Type 1 respectively. The Master Information Block (MIB) includes a limited number of most frequently transmitted parameters. SIB Type 1 messages contain the scheduling information that indicates when the other System Information (SI) RRC messages are transmitted (such as their start times).

The SI-M message is mapped on the Broadcast Control Channel (BCCH) logical channel and carried on the Broadcast Channel (BCH), which is a downlink transport channel. All other System Information (SI) RRC messages including SI-1 are mapped on the Broadcast Control Channel (BCCH) logical channel and dynamically carried on the Downlink Shared Channel (DL-SCH) (another downlink transport channel). The SI-M has a periodicity of 40 ms, whereas SI-1 has a periodicity of 80 ms; both of which are transmitted on a fixed schedule. Reception of either BCH or DL-SCH channels does not require an active RRC connection. In fact, both channels are typically used while a UE is operating without a RRC connection (e.g. RRC_IDLE mode). Each System Information (SI) RRC message is transmitted in a periodically occurring (time domain) window, having a defined semi-static starting point and length, The SI-windows are non-overlapping, and the sizes of all SI-windows are the same. SI-1 configures the SI-window length and the transmission periodicity for the other System Information (SI) RRC messages. A SIB cannot be spread over multiple consecutive SI RRC messages. However, one SI RRC messages may comprise multiple SIBs (if they have the same periodicity). The mapping of SIBs onto SI RRC messages is flexibly configured, and distributed via SI-1 messages.

System information (SI) changes can only occur during specific radio frames, which are referred to as modification periods. SI RRC messages (with the same content) may be scheduled for transmission a number of times within a modification period. The modification period boundaries are defined by System Frame Number (SFN) having modulo N. The value of N is set by current system information parameters. The aforementioned special SI RRC messages for the MIB and the SIB Type 1 messages have predefined schedules. Every UE can receive the publicly broadcast control messages, by using the standardized schedule.

The MIB uses a fixed schedule with a periodicity of 40 ms. The first transmission of the MIB is scheduled in subframe #0 of radio frames for which the System Frame Number (SFN) modulo 4 (four) equals 0 (zero). Each System Frame comprises 10 sub frames. Repeated transmissions of the MIB are scheduled in subframe #0 of all other radio frames.

At step 810, the receiver receives the data service, and determines its pseudonym, based at least in part on a channel characteristic which is specific to the provider device. In one embodiment, the requester estimates a Channel Impulse Response (CIR) 500, comprising any one or more representations of multiple magnitudes, phases, frequencies, time delays, spatial diversities, etc. of the provider device. The requester may also receive optimization information, useful for determining a pseudonym (as previously discussed).

Referring back to FIG. 9A, in the reverse direction, the UE determines the symmetric OTA link characteristic impulse response for the return path (i.e., the Channel Impulse Response (CIR)). Due to channel reciprocity, the OTA channel remains substantially identical in both communication directions. The requester should observe a total communication channel which is substantially identical to the forward path observed by the provider. Recalling that the overall path from each requester to the provider (and return paths), are given by the convolutions of the RF frontends; the requester estimates the return path CIR 500 to arrive at a symmetric identity. It is not necessary for the requester to exchange pseudonyms (implicitly, they will be effectively identical) with the provider. This symmetric quality advantageously enables the requester and provider to "blindly" detect/agree to a pseudonym. It is further appreciated that the requester performs essentially complementary operation to the provider, for pseudonym determination.

In one embodiment, the channel impulse characteristic is approximated with one or more quantization steps. The requester performs a standard quantization of the received channel gains. As previously noted, such quantization may include for example generalized rounding, ceiling rounding, and/or floor rounding. Similarly, rounding may take into account any "hysteresis" (or state memory). Recall that while radio channels do not exhibit hysteresis themselves, temporary changes to a channel may cause erratic "glitches" or artifacts which can be ignored. Hysteresis is also useful for settling "cusp" values during rounding (e.g., the midpoint is a cusp value for general rounding, and may cause jitter effects as the value jumps between the two neighboring values).

In one embodiment, the requester selects a "fixed" portion of the channel characteristics for use in quantization. In an alternate embodiment, the requester dynamically selects a portion of the channel characteristics for quantization.

The dynamic selection of channel characteristics may also be related to the channel characteristics themselves, as previously noted. For example, in a high SNR environment, the requester may use more complex quantization methods, as the CIR will be relatively robust. Conversely, in a low SNR environment, the requester may use simpler quantization. Such quantization determination may be pre-stored, or agreed upon by software (for example, in environments above/below/within X dBm, the provider and requester may establish Y quantization levels, etc.)

The quantized CIR may also be used to generate a pseudonym, where the quantized CIR comprises one or more discrete values (e.g., integer, or logical values). Alternatively, the CIR may be used to generate a pseudonym, where the CIR comprises one or more continuous values (e.g., floating point values, etc.).

At step 812, the first device compares its pseudonym to the user ID within the data transmission. Each BS may be serving multiple UEs. Accordingly, the UE may receive multiple data transmissions, of which many received data transmissions may be assigned to other devices having different user IDs. Moreover, it is appreciated that in mixed populations of enabled and legacy devices, the user ID of any message may be based either on a pseudonym, or on a prior art user ID.

The requester may additionally determine an overall link quality. In one variant, the link quality is used to establish a level of "tolerance" or "envelope" for identifying the pseudonym in noisy environments. As previously mentioned the level of tolerance calculation enables the provider and requester to use similar but not exact user IDs, where the level of difference is attributable to noise or other known phenomena.

In one embodiment, if the pseudonym is within the range of tolerance, then the requester extracts the data service corresponding to its pseudonym. The requester decodes the data services, and compares the decoded data service to its pseudonym. If the data service is addressed to a user ID which is substantially similar to its pseudonym, then the requester consumes the service. Otherwise, the requester ignores the service.

Moreover, as previously stated, multipaths are generally unique—however, such uniqueness is not guaranteed. Thus, in some implementations, an entity with a duplicative user ID merely causes a denial of service (i.e., the request is never serviced), whereas other implementations may "fallback" to other identification or verification schemes. Thus, a denial of a pseudonym can be a denial of service, or alternatively, the requester initiates or is offered another means of identification such as the "standard" user identification process for that air interface specification (e.g., UMTS AKA, and IMSI transmission, etc.), or a modified version of the foregoing pseudonym approach.

In another embodiment, the owner of the requesting device (e.g., the mobile device, etc.) may be queried to allow the owner to accept or modify the received service (such as may be useful with unsolicited advertisements). In this case, the decision to accept the service is predicated upon the owner's response to a query (or one programmed into his device). In one variant, the owner may be asked to give each new requester a new "owner-given ID". This owner-given ID is recognizable by the owner, and can comprise for example a meaningful plain text ID and consist of ASCII symbols or XML, such that it could be human readable (e.g., "The local hangout", etc.). In another variant, the owner-given ID may comprise a graphic object or icon such as an avatar which may comprise e.g., a picture of a storefront, a picture of a menu item, a picture of the owner of the establishment, etc.

The quality of reception may also advantageously be used for selection of the modulation and/or coding scheme of the transmission. In one variant, the link quality is used to establish a level of modulation "complexity" or other parameter useful in setting modulation/coding for the channel. For example, the link quality may relate directly to the order of the constellation size (BSPK, QPSK, QAM16, QAM64, etc.) as previously discussed.

Apparatus—

Exemplary apparatus useful for practicing one or more aspects of the present invention are now discussed in greater detail. While the following discussions are divided into "requester" and "provider" type apparatus, it is appreciated that a "requesting" device may also be a "provider" device, and vice versa. For example, in one exemplary embodiment, the various aspects of the invention may be used in inter-base station communication (e.g., femtocell to macrocell, femtocell to femtocell, macrocell to macrocell, etc.). Similarly, in another exemplary embodiment, the present invention is used for ad hoc networking of multiple substantially similar wireless devices (e.g., WLAN, Bluetooth, Wireless USB, etc.). Additionally, a requesting device may change over to a providing device (and vice versa). A device may offer both requesting and providing functions simultaneously.

Thus, as used herein, the terms "provider", and "requester" include but are not limited to "client device", "end user device", "UE", "station" (e.g., Wi-Fi STA), "base station" (e.g., femtocell, macrocell, etc.), and "access point" (e.g., Wi-Fi AP). Moreover, such apparatus may include cellular telephones, smartphones (such as for example an iPhone™), Wireless LAN devices, ad hoc networking devices, personal networking devices, personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, macrocells, femtocells, picocells, NodeBs, eNodeBs, Home NodeBs, Home eNodeBs, etc. residential gateways, wireless routers, or any combinations of the foregoing.

The following discussions of exemplary apparatus are provided merely to illustrate representative apparatus for such conceptual entities, and should not be construed as limiting in any way.

Requester Apparatus—

The requester may selectively decode one or more offered subscription-less data services based on device, usage, and/or network considerations. For example, if a user desires transitory information specific to nearby providers (such as while shopping, etc.), then he may adjust his requester radio operation to identify, and request access to, any subscription-less data providers on a "wandering" or nomadic basis.

In another example, if a user desires transitory information provided by a specific provider (such as a hotspot), then he may initiate his requester radio operation to request access to the specific provider.

In yet another example, a requester may automatically initiate an emergency call using subscription-less services, thereby skipping registration processes, and expediting service/routing.

Moreover, the requester can consider other factors or parameters in determining how to adjust its operation. For instance, remaining battery power of the requester may be a consideration causing the requester to adjust operation so as to minimize resource use (and hence power consumption). Furthermore, available operating modes on the network (e.g., within a given RAN or RAT) may cause the requester to adjust its operations.

Figure 10:
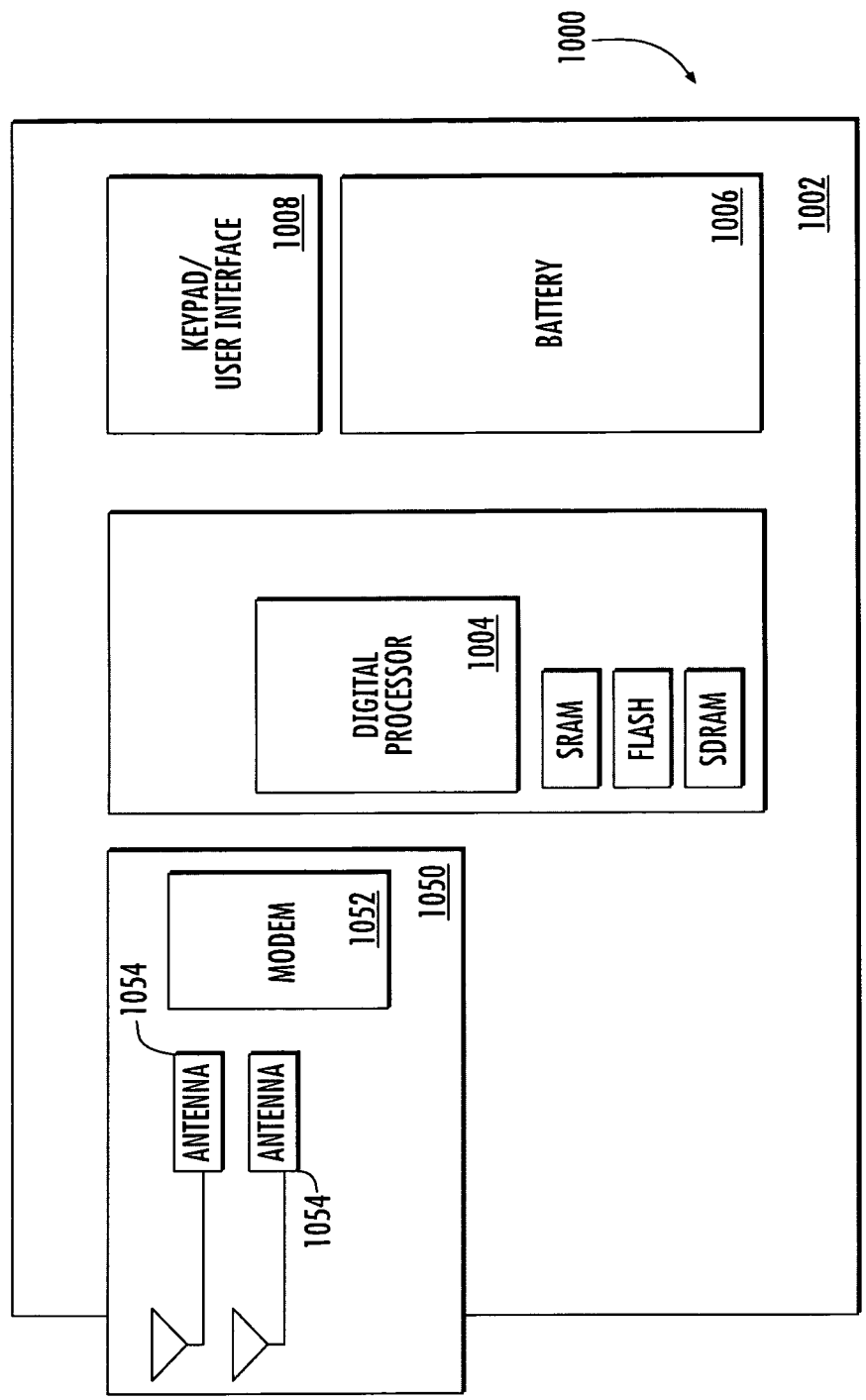
FIG. 10 is a block diagram of one embodiment of a requester apparatus configured in accordance with the present invention.

Referring now to FIG. 10, one exemplary requester apparatus 1000 useful in implementing the methods of the present invention are illustrated. The apparatus disclosed comprises, inter alia, a device such as a smartphone, portable computer, or mobile communications device capable of subscription-less data reception. The identification, request for, and configuration for subscription-less data reception are preferably performed in software, although hardware/firmware embodiments are also envisioned.

The requester apparatus 1000 includes one or more substrate(s) 1002 that further include a plurality of integrated circuits including a processing subsystem 1004 such as a digital signal processor (DSP), microprocessor, programmable logic device (PLD), gate array, or plurality of processing components as well as a power management subsystem 1006 that provides power to the requester 1000, a user interface (UI) subsystem 1008, and a radio subsystem 1050. As used herein, the term "integrated circuit (IC)" refers to any type of device having any level of integration (including without limitation VLSI, VLSI, and LSI) and irrespective of process or base materials (including, without limitation Si, SiGe, CMOS and GaAs).

The processing subsystem may also comprise an internal cache memory. The processing subsystem 1004 is connected to a memory subsystem comprising memory which may, for example, include SRAM, Flash and SDRAM components. The memory subsystem may implement one or a more of DMA type hardware, so as to facilitate data accesses, as is well known in the art.

The illustrated power management subsystem (PMS) 1006 provides power to the requester, and may include an integrated circuit and/or a plurality of discrete electrical components. In one exemplary portable requester apparatus, the power management subsystem 1006 interfaces with a rechargeable battery power source within the requester.

The user interface subsystem 1008 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card type embodiments may lack a user interface (as they could piggyback onto the user interface of the host device to which they are physically and/or electrically coupled).

The apparatus 1000 may further include optional additional peripherals including, without limitation, one or more GPS transceivers, or network interfaces such as IrDA ports, Bluetooth transceivers, USB, FireWire™, WiMAX transceivers, etc. It is however appreciated that these components are not required for operation of the requester in accordance with the principles of the present invention.

The radio subsystem 1050 includes one or more RF front-ends 1052, and a plurality of decoding resources 1054. The RF front-ends 1052 of the illustrated embodiment generally include the antennas and any analog stages used to convert a received radio signal to a digital signal. A RF front-end may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception, RF front-ends are generally adapted to a very limited range of operation.

In some instances, multiple RF front-ends 1052 may be required for different radio frequencies, and or radio access technologies (RATs). For example, in the illustrated embodiment, the requester has two (2) RF front-ends. It is readily appreciated that in some embodiments, the RF front-ends may support any combination of MIMO (Multiple Input Multiple Output), SIMO (Single Input Multiple Output), MISO (Multiple Input Single Output), and SISO (Single Input Single Output) antennas.

The plurality of decoding resources 1054 of the illustrated embodiment includes apparatus adapted to decode received data. Generally, decoding resources may include such elements as processing elements, application specific circuitry, and or other common communication elements, such as Fast Fourier Transforms (FFT) processing, Multiply Accumulate (MAC) logic, arithmetic logic units (ALU), floating point logic, etc. In one specific embodiment, the decoding resources are configurable. FFT-based computational resources, adapted for decoding subcarriers of an Orthogonal Frequency Division Multiple Access/Time Division Multiple Access (OFDMA/TDMA) modulation scheme. Such FFT resources are flexibly programmed at subframe time intervals to decode any subset of a plurality of the subcarriers which populate the entire carrier bandwidth. The subdivision of time (i.e., subframes) and frequency (i.e., subcarriers) can be viewed as a "grid" of decoding resources.

As previously mentioned (see discussion of FIG. 6), the time and frequency domain are related to one another by the Fourier Transform (e.g., FFT), and Inverse Fourier Transform (e.g., IFFT). The two domains for CIR representations are mathematically equivalent, and may be used interchangeably. The Fast Fourier Transform converts a time-domain signal into its frequency domain equivalent. As is well known throughout the arts, the FFT receives an array of time sampled data (amplitude vs. time), and performs an iterative "butterfly" operation, to generate an array of spectral amplitude versus frequency. In an OFDMA receiver, the entire bandwidth is subdivided into subcarriers. Each subcarrier spans a relatively short frequency range. Accordingly, the FFT is used to isolate only the amplitudes of the sub carriers of interest to the receiver.

In multimode systems, multiple types of RF front-ends 1052 and decoding resources 1054 may be intermixed, and or interchanged. In some cases, the functionality of one or more components may be performed by a single component. The numerous possible combinations of the various RF front-ends and decoding resources are readily appreciated by those of ordinary skill in the arts given the present disclosure.

Figure 11:
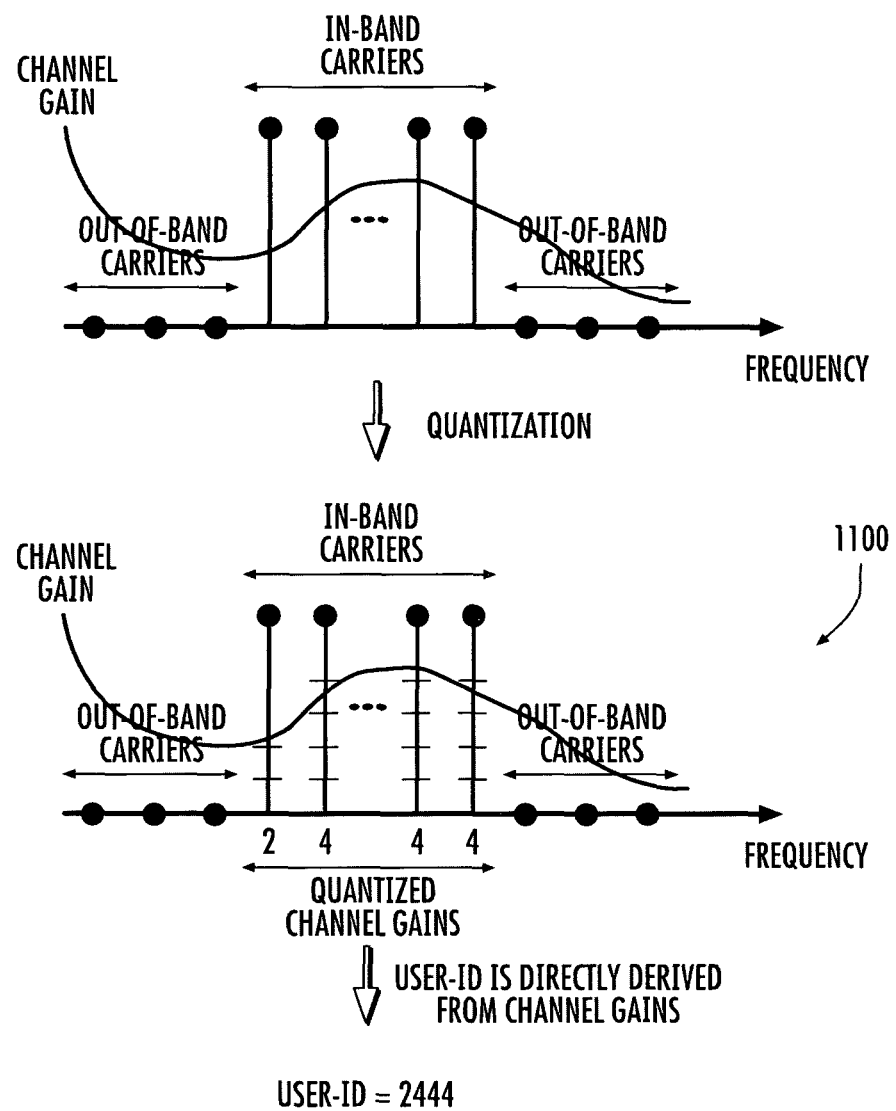
FIG. 11 is a graphical illustration of one embodiment of the quantization operation of a Channel Impulse Response in accordance with the present invention.

In one exemplary embodiment, the radio subsystem is specifically adapted to derive a pseudonym from one or more channel characteristics, in accordance with the previously described method. Such proxy identification may be used in the anonymous reception of subscription-less data transmissions. For example, referring to the embodiment shown in FIG. 11, a requester may collect channel gain information from a frequency domain CIR for a subscription-less data frame to derive a pseudonym. In this example, the in-band carrier gain coefficients would specify a pseudonym of [2, 4, . . . 4, 4]. In alternate embodiments, a requester may collect channel gain information from a time domain CIR to derive a pseudonym.

Once the radio subsystem has identified a pseudonym, a subset of the decoding resources 1054 will be allocated to decode the subscription-less data transmission. The decoding resources may be e.g., shared between subscription-less data decoding and generic data usage decoding. Accordingly, allocating decoding resources for the subscription-less data decreases the amount of resources available to decode other data. Consequently, to minimize interruptions in other services, the modem subsystem may additionally be required to provide buffering capabilities. In one variant, the interrupted data may be buffered during subscription-less data decoding and decoded once the subscription-less data is finalized (i.e., "caught up").

Alternatively, in a second variant, the subscription-less data is buffered and decoded during lulls in the decoding of other data (e.g., between the transmission of two frames of other useful data, etc.); i.e., on an opportunistic basis.

Figure 12:
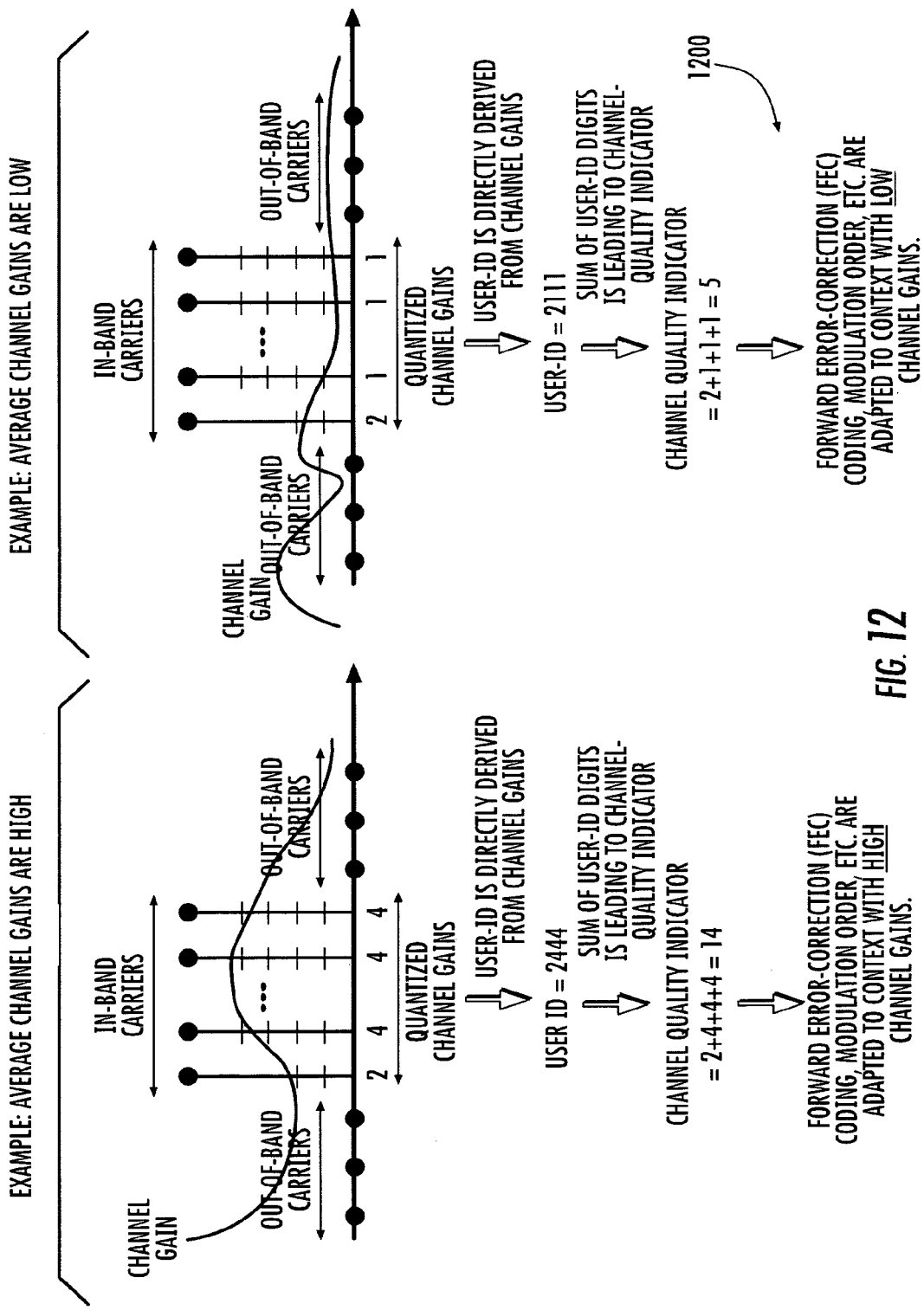
FIG. 12 is a graphical illustration of a comparison between two (2) exemplary quantized Channel Impulse Responses in accordance with the present invention.

In one embodiment, the radio subsystem is specifically adapted to derive modulation or coding schemes from one or more channel characteristics, in accordance with the previously described method. Such modulation and coding determination may be used in the anonymous reception of subscription-less data transmissions. For example, as shown in FIG. 12, a requester apparatus 1200 may collect channel gain information from a frequency domain CIR 500 for a subscription-less data frame to establish an aggregate channel link quality. In this example, the requester apparatus has calculated the in-band carrier gain coefficients [2, 4, . . . 4, 4]. The requester apparatus may sum these coefficients to generate an aggregate channel link quality. In another example, a requester apparatus may collect channel gain information from a time domain CIR to derive channel gain information. Based at least in part on the aggregate channel quality, the requester then selects a modulation and coding scheme.

In the foregoing example, the sum of the array may be used as an indication of quality or performance level; e.g., to suggest a high quality channel link. Accordingly the requester may select a 64-QAM or 256-QAM link (high constellation density), and relatively lightly coded data rates. In contrast, during low quality channel links, the requester may select a BPSK link (low constellation density), and heavily code the data, so as to compensate for the poor channel quality and ostensibly higher BER.

Provider Apparatus—

Figure 13:
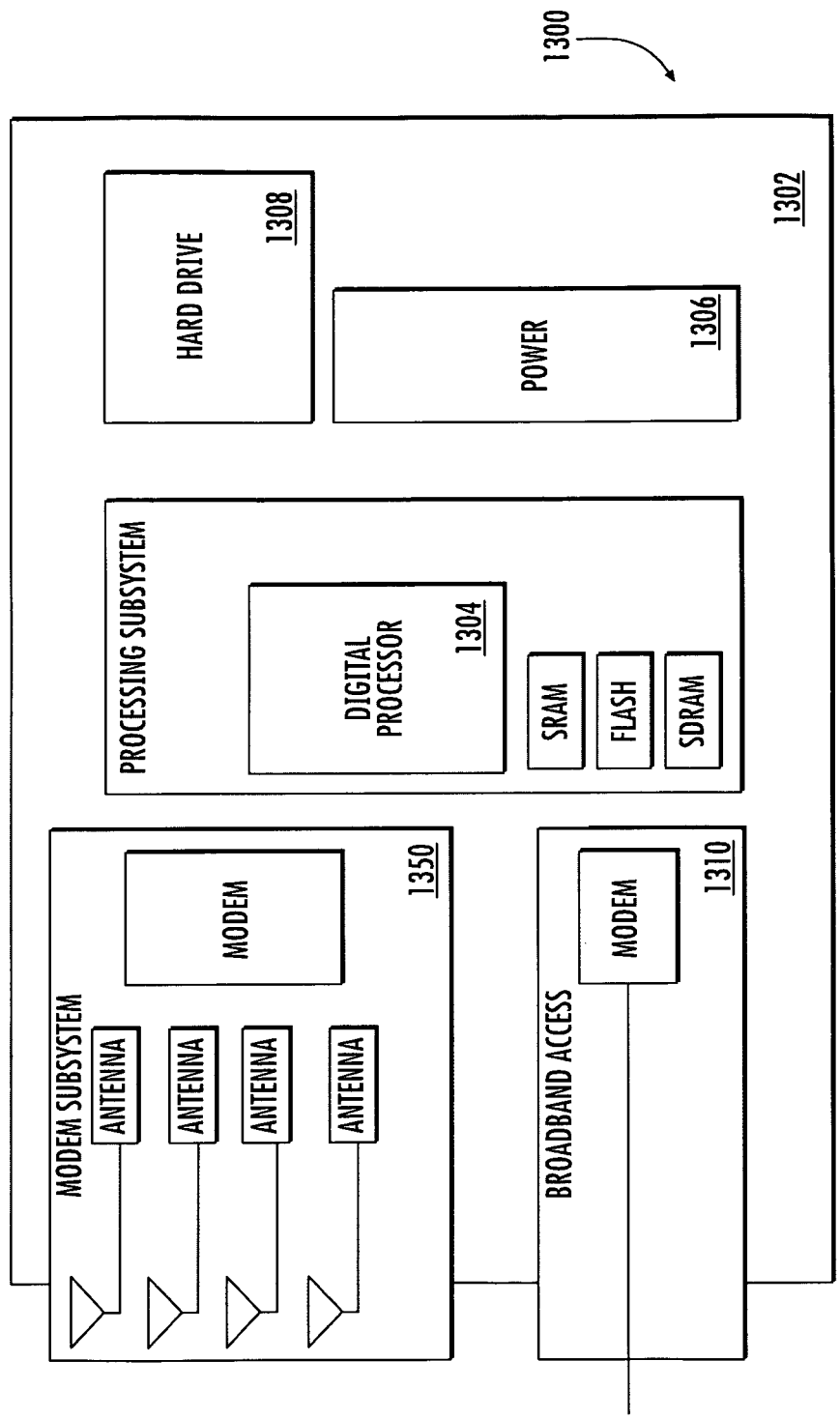
FIG. 13 is a block diagram of one embodiment of a provider apparatus configured in accordance with the present invention.

Referring now to FIG. 13, one embodiment of provider apparatus 1300 implementing the methods of the present invention is illustrated. The provider apparatus 1300 includes one or more substrate(s) 1302 that further include a plurality of integrated circuits including a processing subsystem 1304 such as a digital signal processor (DSP), microprocessor, gate array, PLD, or plurality of processing components as well as a power management subsystem 1306 that provides power to the provider 1300. A memory device 1108 is also shown for storage of media, data and executable code.

The embodiment of the apparatus 1300 shown in FIG. 13 at a high level includes a modem circuit 1350 configured to provide a subscription-less data transmission. The subscription-less data transmission are each selectively transmitted with a corresponding pseudonym which is derived from the one or more channel characteristics between the provider and the requester device. The modem subsystem includes one or more digital modems and a plurality of antenna.

The illustrated apparatus also includes a broadband access circuit 1310 that is configured to provide access to other network entities. The broadband access may be for example a simple DSL connection. In other embodiments, the broadband access may be a T1, ISDN, satellite link, or DOCSIS cable modem. In one variant, the broadband access only supports authenticated connections, thereby ensuring secure and authorized connections to the network infrastructure. In other variants, the broadband access can provide substantially unauthenticated access to other IP networks, thereby offering a wireless gateway to any connected internets, or the Internet (e.g., such as may be useful with WLAN embodiments of the invention).

In an alternate embodiment, the apparatus 1300 is substantially operated in a standalone manner. Such apparatus may be useful for closed-circuit data systems, such as isolated networks, and/or limited data usage models.

The processing subsystem 1304 may include a plurality of processors (or multi-core processor(s)). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem 1304 is in data communication with one or more memory components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem of the embodiment illustrated in FIG. 13 includes various forms of volatile (e.g. SRAM, SDRAM, etc.) and non-volatile memory such as a hard disk drive (HDD), and or Flash. Additionally, the processing subsystem may also comprise a cache to facilitate processing operations.

In one variant, the radio subsystem 1308 is specifically adapted to derive a pseudonym from one or more channel characteristics, in accordance with the previously described methods. For example, referring again to FIG. 12 described above, exemplary channel coefficients for two distinct requester devices are illustrated. In this example, the in-band carrier gain coefficients for the first requester would specify a pseudonym of [2, 4, . . . 4, 4], whereas the in-band carrier gain coefficients for the second requester would specify a pseudonym of [2, 1, . . . 1, 1]. In alternate embodiments, a time domain CIR may be used.

In one variant, the channel characteristics may additionally be used to determine appropriate modulation schemes for the provisioning of subscription-less data transmissions. In the foregoing example of FIG. 12, the channel coefficients of the first requester indicate that its communication channel is significantly better than the second requester. Thus, improved services can be provided, such as by increasing data rates, constellations (BPSK, QPSK, 16-QAM, and 64-QAM, etc), and or reducing error correction overhead or coding rates. For instance, the coefficients of the pseudonym may be directly summed together, providing a linear indication of channel quality. In alternate implementations, the coefficients of the pseudonym may undergo further modification to provide varying degrees of desirable weighting. For example, summing the square roots of the coefficients of the pseudonym reduces the impact of outlying coefficients (e.g., favoring multiple similar strength multipath channels), whereas summing the squares of the coefficients of the pseudonym increases the impact of peak coefficients (e.g., favoring channels having fewer high power multipath channels).

Once the radio subsystem has identified a pseudonym, a requested subscription-less data service, and one or more appropriate modulation schemes, the provider allocates a subset of its encoding resources to encode the subscription-less data transmission.

Business Methods and Rules Engine—

It will be recognized that the foregoing network access control apparatus and methodologies may be readily adapted to various business models. For example, in one such model, a service provider/network operator may provide a subscription-less data services to customers willing to pay a premium, as an incentive for its higher-tier customers, or even subsidized by other $3^{rd}$ parties. Thus, a network operator may offer sponsored broadcasts, or multicasts of e.g., advertisements, user incentives, etc.

In another business model, a cellular network operator may provide movies or short videos intermixed with commercial material, the latter being optionally tailored to the content of the former (e.g., auto advertisements for a video or movie relating to car racing).

In yet another model, a cellular network operator may provide free multicast services tailored to different UE classes. For instance, all UEs with a high data rate may be grouped within a first class, and lower data rate UEs may be grouped within a second class. An "identical" service may be provided to both first and second class UEs, where the UEs of the second class actually receive lower data rate (e.g., transcoded or transrated, HD versus SD, etc.) versions of the service provided to UEs of the first class, or alternatively the first class receives up-converted versions of the lower rate content sent to the second class.

In another model, unicast service (point-to-point) may be provided by the network operator e.g., sponsored by commercials, etc.

Other uses for subscription-less data services may include location tracking, and/or machine-to-machine (M2M) based services, such as those described in co-owned and co-pending U.S. patent application Ser. No. 12/231,095 filed Aug. 29, 2008 and entitled "Methods and Apparatus for Machine-to-Machine Based Communication Service Classes" filed concurrently herewith, which is incorporated herein by reference in its entirety. Such subscription-less based data services may be used in conjunction with machine-to-machine based location specific temporary data, and/or, emergency services, etc. For example, a fleet management system may use subscription-less data services to monitor its overall fleet efficiency, by using secure, anonymous subscription-less fleet feedback.

In another paradigm, certain strategic base stations can be configured to provide subscription-less data services based on inter alia their number of subscribers, rate of usage, geographic location, etc. Alternatively, certain small business owners may purchase such devices to provide advertising or preferential services for their customers (e.g., a coffee house, etc.).

The aforementioned network apparatus and methodologies may also be readily adapted for operation in accordance with an underlying business rules "engine". This business rules engine may comprise for example a software application and/or hardware. In one embodiment, the business rules engine takes into account the revenue and/or profit implications associated with providing subscription-less data access to known or unknown users via one or more base stations. This may be done for any number of different reasons. For example, a small business owner such as a coffee shop may find that during peak levels of customer service, subscription-less data can be used to offer free entertainment within the store. In contrast, during low levels of customer service, subscription-less data can be used to run advertisements and coupons for people passing by. Accordingly, the exemplary business rules engine can modify the behavior of the system at specific steps described in the methodologies above in order to accomplish one or more economic objectives for the network operator. These "business rules" may be imposed e.g., at time of resource request and then maintained for a period of time (or until an event triggering a re-evaluation occurs), or alternatively according to a periodic model. Myriad different schemes for implementing dynamic allocation of resources will be recognized by those of ordinary skill given the present disclosure.

Moreover, all or a portion of the foregoing analyses for business rules can be performed at the base station itself if so configured, such as via a client portion of distributed application (DA) in communication with a parent or "server" portion.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for anonymously providing a subscription-less data service to a wireless device, the method comprising:
   receiving a first communication from the wireless device;
   determining a first pseudonym based at least in part on a first channel impulse response (CIR) of the first communication;
   associating the subscription-less data service with the first pseudonym;
   transmitting the subscription-less data service and the first pseudonym to the wireless device in a second communication; and
   at the wireless device:
      determining a second pseudonym based at least in part on a second CIR of the second communication;
      comparing the first pseudonym to the second pseudonym;
      determining whether the first pseudonym is substantially similar to the second pseudonym; and
      in response to determining that the first pseudonym is substantially similar to the second pseudonym, decoding the second communication comprising the subscription-less data service,
   wherein the second communication comprising the subscription-less data service is an anonymous communication without a security key.

2. The method of claim 1, wherein the second pseudonym is determined at the wireless device.

3. The method of claim 1, wherein the wireless device compares the first pseudonym to the second pseudonym to determine whether the second communication comprising the subscription-less data service is intended for the wireless device.

4. The method of claim 1, wherein the first communication comprises a request for the subscription-less data service, and wherein the second communication comprising the subscription-less data service is a broadcast communication that is receivable by a plurality of different devices, including the wireless device.

5. The method of claim 4, wherein the plurality of different devices are mobile cellular communication devices that are configured to receive broadcast communications from a cellular network base station.

6. A network apparatus for anonymously providing a subscription-less data service to a wireless device, the network apparatus comprising:
at least one radio transceiver;
one or more processors coupled to the at least one radio transceiver; and
a memory component coupled to the one or more processors and storing computer-executable instructions that, when executed by the one or more processors, cause the network apparatus to:
generate a pseudonym for the wireless device based at least in part on a channel impulse response (CIR) of a communication received from the wireless device,
wherein the CIR is associated with a plurality of in-band carrier gain coefficients of the communication received from the wireless device, and
wherein the communication received from the wireless device comprises a request for the subscription-less data service;
associate the subscription-less data service with the generated pseudonym to indicate the wireless device as an intended broadcast communication recipient; and
transmit the subscription-less data service and the generated pseudonym to the wireless device within a broadcast communication that is receivable by a plurality of different devices, including the wireless device,
wherein the broadcast communication does not include a security key.

7. The network apparatus of claim 6, wherein the pseudonym is generated at the network apparatus subsequent to the receipt of the communication comprising the request for the subscription-less data service.

8. The network apparatus of claim 6, wherein the CIR includes a multipath signature that is unique to the communication received from the wireless device.

9. The network apparatus of claim 6, wherein the pseudonym generated by the network apparatus is discarded by the network apparatus after the transmission of the subscription-less data service and the generated pseudonym to the wireless device within the broadcast communication.

10. The network apparatus of claim 6, wherein the CIR is a time-domain representation of one or more communication channel characteristics associated with the communication received from the wireless device.

11. The network apparatus of claim 6, wherein the CIR is a frequency-domain representation of one or more communication channel characteristics associated with the communication received from the wireless device.

12. The network apparatus of claim 6, wherein the pseudonym is generated by the network apparatus based at least in part on a differential representation of the CIR of the communication received from the wireless device.

13. The network apparatus of claim 6, wherein the pseudonym is generated by the network apparatus based at least in part on a relative representation of the CIR of the communication received from the wireless device.

14. The network apparatus of claim 6, wherein the CIR is associated with an array of time-domain channel components separated in time.

15. The network apparatus of claim 14, wherein time separations between the time-domain channel components are associated with phase differences in the frequency-domain.

16. The network apparatus of claim 6, wherein the generated pseudonym indicating the wireless device as the intended broadcast communication recipient is periodically updated at the network apparatus.

17. Then network apparatus of claim 6, wherein the pseudonym is generated by the network apparatus based on one or more quantized radio channel characteristics.

18. A wireless device for receiving a subscription-less data service via broadcast communications, the wireless device comprising:
at least one radio transceiver;
one or more processors coupled to the at least one radio transceiver; and
a memory component coupled to the one or more processors and storing computer-executable instructions that, when executed by the one or more processors, cause the wireless device to:
receive a broadcast communication from a network device including a subscription-less data service and a first pseudonym, wherein the broadcast communication does not include a security key;
generate a second pseudonym based at least in part on a channel impulse response (CIR) of the received broadcast communication, wherein the CIR is associated with a quantized radio channel characteristic, comprising one or more radio signal magnitudes or one or more discrete time-domain signal values, specific to the broadcast communication received from the network device;
compare the first pseudonym to the second pseudonym; and
decode the received broadcast communication when the first pseudonym is substantially similar to the second pseudonym.

19. The wireless device of claim 18, wherein the CIR is associated with a quantization parameter of the received broadcast communication.

20. The wireless device of claim 18, wherein the quantized radio channel characteristic further comprises one or more frequency-domain signal values.

21. The wireless device of claim 18, wherein the quantized radio channel characteristic further comprises one or more phase difference values represented in the time-domain or the frequency-domain.

22. The wireless device of claim 18, wherein the broadcast communication is received in response to a request for the subscription-less data service emanating from the wireless device.

23. The wireless device of claim 22, wherein the request for the subscription-less data service does not contain information explicitly identifying the wireless device.

24. A method for anonymously receiving data services at a wireless device, the method comprising:
receiving a first pseudonym within a broadcast communication from a network device
wherein the broadcast communication does not include a security key;
identifying a channel impulse response (CIR) of the broadcast communication,
wherein the CIR is associated with a quantized radio channel characteristic comprising one or more radio signal magnitudes or one or more discrete time-domain signal values, specific to the broadcast communication received from the network device;

generating a second pseudonym that is derived from the CIR associated with the broadcast communication;

comparing the first pseudonym to the second pseudonym to determine whether at least a portion of the broadcast communication is intended for the wireless device; and in response to determining that at least a portion of the broadcast communication is intended for the wireless device, decoding a corresponding portion of the broadcast communication at the wireless device, wherein the second pseudonym is generated at the wireless device without considering the first pseudonym received within the broadcast communication.

25. The method of claim 24, wherein the broadcast communication is received at the wireless device in response to a request for a subscription-less data service emanating from the wireless device.

26. A mobile device, comprising:

at least one wireless transceiver;

one or more processors coupled to the at least one wireless transceiver; and a memory component coupled to the one more processors and storing computer-executable instructions that, when executed by the one or more processors, cause the mobile device to:

receive a first pseudonym within a broadcast communication from a network device, wherein the broadcast communication does not include a security key;

identify a channel impulse response (CIR) of the broadcast communication, wherein the CIR is associated with a quantized radio channel characteristic comprising one or more radio signal magnitudes or one or more discrete time-domain signal values, specific to the broadcast communication received from the network device;

generate a second pseudonym that is derived from the CIR associated with the broadcast communication;

compare the first pseudonym to the second pseudonym to determine whether at least a portion of the broadcast communication is intended for the mobile device; and in response to determining that at least a portion of the broadcast communication is intended for the mobile device, decoding a corresponding portion of the broadcast communication at the mobile device.

* * * * *

UNITED STATES PATENT AND TRADEMARK OFFICE
CERTIFICATE OF CORRECTION

PATENT NO. : 8,711,751 B2
APPLICATION NO. : 12/567327
DATED : April 29, 2014
INVENTOR(S) : Marcus Mueck et al.

It is certified that error appears in the above-identified patent and that said Letters Patent is hereby corrected as shown below:

In the Claims

Col. 30, line 11, "Then" should be changed to --The--
Col. 30, line 64, "indentifying" should be changed to --identifying--

Signed and Sealed this
Twenty-second Day of July, 2014

Michelle K. Lee
*Deputy Director of the United States Patent and Trademark Office*